(12) United States Patent
Gao et al.

(10) Patent No.: US 8,644,963 B2
(45) Date of Patent: *Feb. 4, 2014

(54) EXTENDED ACTIVE DISTURBANCE REJECTION CONTROLLER

(75) Inventors: Zhiqiang Gao, Westlake, OH (US); Gang Tian, Westlake, OH (US)

(73) Assignee: Cleveland State University, Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/464,558

(22) Filed: May 4, 2012

(65) Prior Publication Data

US 2012/0283850 A1    Nov. 8, 2012

Related U.S. Application Data

(63) Continuation of application No. 12/195,353, filed on Aug. 20, 2008, now Pat. No. 8,180,464, which is a continuation of application No. 10/351,664, filed on Jan. 27, 2003, now Pat. No. 8,041,436, and a continuation-in-part of application No. 12/067,141, filed as application No. PCT/US2006/036156 on Sep. 18, 2006, now Pat. No. 8,060,340, which is a continuation-in-part of application No. 10/351,664.

(60) Provisional application No. 60/965,359, filed on Aug. 20, 2007, provisional application No. 60/373,404, filed on Apr. 18, 2002, provisional application No. 60/718,393, filed on Sep. 19, 2005, provisional application No. 60/718,581, filed on Sep. 19, 2005, provisional application No. 60/718,899, filed on Sep. 20, 2005, provisional application No. 60/728,928, filed on Oct. 20, 2005, provisional application No. 60/728,929, filed on Oct. 20, 2005.

(51) Int. Cl.
*G05B 13/02* (2006.01)

(52) U.S. Cl.
USPC .............. 700/44; 700/28; 700/37; 700/41; 700/45; 703/2

(58) Field of Classification Search
USPC ........ 700/28–31, 37–45; 703/1–2; 706/13, 52
See application file for complete search history.

(56) References Cited

U.S. PATENT DOCUMENTS 3,543,010 A    11/1970  Dahlin
3,786,242 A *   1/1974  Brooks ............................ 703/4
(Continued)

FOREIGN PATENT DOCUMENTS

WO          00/41043 A1    7/2000
WO       2007/035559 A3    3/2007

OTHER PUBLICATIONS

Canadian OA for Canadian Application No. 2,663,742 dated Jun. 9, 2012, 2 pages.

(Continued)

*Primary Examiner* — Ramesh Patel
(74) *Attorney, Agent, or Firm* — Turocy & Watson, LLP

(57) ABSTRACT

Multiple designs, systems, methods and processes for controlling a system or plant using an extended active disturbance rejection control (ADRC) based controller are presented. The extended ADRC controller accepts sensor information from the plant. The sensor information is used in conjunction with an extended state observer in combination with a predictor that estimates and predicts the current state of the plant and a co-joined estimate of the system disturbances and system dynamics. The extended state observer estimates and predictions are used in conjunction with a control law that generates an input to the system based in part on the extended state observer estimates and predictions as well as a desired trajectory for the plant to follow.

9 Claims, 5 Drawing Sheets

(56) References Cited

U.S. PATENT DOCUMENTS

| | | | |
|---|---|---|---|
| 3,826,887 A | | 7/1974 | Pemberton |
| 4,481,567 A | * | 11/1984 | Kaya et al. ............... 700/37 |
| 4,768,143 A | * | 8/1988 | Lane et al. ............... 700/37 |
| 5,229,699 A | | 7/1993 | Chu et al. |
| 5,369,345 A | * | 11/1994 | Phan et al. ............... 318/561 |
| 5,397,973 A | | 3/1995 | Dummermuth |
| 5,404,289 A | | 4/1995 | Hang et al. |
| 5,680,304 A | | 10/1997 | Wang et al. |
| 5,742,503 A | | 4/1998 | Yu |
| 5,805,447 A | | 9/1998 | Teng et al. |
| 6,122,555 A | * | 9/2000 | Lu ............... 700/9 |
| 6,128,541 A | | 10/2000 | Junk |
| 6,195,982 B1 | | 3/2001 | Gysling et al. |
| 6,445,962 B1 | | 9/2002 | Blevins et al. |
| 6,510,353 B1 | * | 1/2003 | Gudaz et al. ............... 700/37 |
| 6,546,295 B1 | | 4/2003 | Pyotsia et al. |
| 6,564,194 B1 | * | 5/2003 | Koza et al. ............... 706/13 |
| 6,631,299 B1 | | 10/2003 | Patel |
| 6,658,305 B1 | | 12/2003 | Gudmundsson et al. |
| 6,980,869 B1 | | 12/2005 | Chandhoke |
| 7,024,253 B2 | | 4/2006 | Gaikwad et al. |
| 7,865,254 B2 | | 1/2011 | Gahinet et al. |
| 8,180,464 B2 | * | 5/2012 | Gao et al. ............... 700/44 |
| 2003/0139825 A1 | | 7/2003 | Lund |
| 2003/0199997 A1 | * | 10/2003 | Gao ............... 700/18 |
| 2007/0073422 A1 | * | 3/2007 | Gaikwad et al. ............... 700/37 |
| 2007/0088448 A1 | * | 4/2007 | Mylaraswamy et al. ....... 700/44 |

OTHER PUBLICATIONS

Aaron, "Synthesis of Feedback Control Systems by Means of Pole and Zero Location of the Closed Loop Function". Transactions of the American Institute of Electrical Engineers. vol. 70 (1951): pp. 1439-1446.

OA dated Sep. 8, 2006 for U.S. Appl. No. 10/351,664, 16 pages.
OA dated May 1, 2007 for U.S. Appl. No. 10/351,664, 17 pages.
OA dated Nov. 14, 2007 for U.S. Appl. No. 10/351,664, 16 pages.
OA dated Nov. 21, 2008 for U.S. Appl. No. 10/351,664, 14 pages.
OA dated Jul. 31, 2009 for U.S. Appl. No. 10/351,664, 2 pages.
OA dated Apr. 12, 2010 for U.S. Appl. No. 10/351,664, 21 pages.
OA dated Mar. 3, 2011 for U.S. Appl. No. 10/351,664, 27 pages.
Indian Office Action for Indian Application No. 759/MUMNP/2008, dated Feb. 15, 2012, 2 pages.

McIntosh, et al., Selection of Tuning Parameters for Adaptive Generalized Predictive Control, American Control Conference, pp. 1846-1851, American Control Conference, Alberta, Canada, Jun. 21-23, 1989.

Kristiansson, et al., Robust and optimal tuing of PI and PID controllers, IEE Proceedings—Control Theory and Applications, vol. 149, Issue 1, pp. 17-25, 2002.

OA dated Mar. 14, 2012 for U.S. Appl. No. 13/212,274, 40 pages.

Chinese Office Action dated Jan. 10, 2013 for Chinese Patent Application No. 201110136608.3, 7 pages.

Ghanekar, et al. "Scaling laws for Frequency Domain Controllers of Dynamically Equivalent Single Flexible Link Manipulators," IEEE vol. 1, pp. 919-924, Proceedings of Int'l. conf. on Robotics and Automation, Nagoya, Japan, May 21-27, 1995.

Ghanekar, et al., "Scaling Laws for Linear Controllers of Flexible Link Manipulators Characterized by Nondimensional Groups," IEEE Transactions on Robotics and Automation, IEEE Inc., NY vol. 13, No. , pp. 117-127, 1997.

Suh, et al. "New PID Identification Algorithm Based on Frequency Scaling." IEEE, Proc. of 40th Midwest Symposium, Sacramento, CA, pp. 654-658, 1997.

Gao, Zhiqiang, et al. "A Stable-Tuning Fuzzy Logic Control System for Industrial Temperature Regulation", IEEE Transactions on Industry Applications, vol. 38, No. 2, pp. 414-424, Mar./Apr. 2002.

Hu, Shaohua, et al., "A Time-Optimal Unified Servo Control Method With a Two-Degree of Freedom Structure for a Hard Disk Drive", 2005 American Control Conference Jun. 8-10, 2005. Portland, OR.

Gao, Zhiqiang, et al., "A Novel Motion Control Design Approach Based on Active Disturbance Rejection", Proceedings of the 40th IEEE Conference on Decision and Control, Orlando, Florida, Dec. 2001.

Gao, Zhiqiang, "Scaling and Bandwidth-Parameterization Based Controller Tuning", Proceedings of the American Control Conference, Denver, Colorado, pp. 4989-4996, Jun. 406, 2003.

Gao, Zhiqiang, "Active Disturbance Rejection Control: A Paradigm Shift in Feedback Control System Design". Proceedings of the 2006 American Control Conference, Minneapolis, Minnesota, pp. 2399-2405, Jun. 14-16, 2006.

Miklosovic, Robert, et al., "Discrete Implementation and Generalization of the Extended State Observer", Proceedings of the 2006 American Control Conference Minneapolis, Minnesota. pp. 2209-2214, Jun. 14-16, 2006.

International Search Report for application PCT/US06/036156 dated Mar. 17, 2009.

* cited by examiner

EXTENDED ACTIVE DISTURBANCE REJECTION CONTROLLER

CROSS-REFERENCE TO RELATED APPLICATIONS

This application claims the benefit of U.S. Application No. 60/965,359 filed 20 Aug. 2007. This application is a continuation in part and claims the benefit of the following Applications: U.S. application Ser. No. 12/067,141 filed 17 Mar. 2008, and issued as U.S. Pat. No. 8,060,340 on 10 Sep. 2008; that claims priority to the following: Patent Cooperation Treaty Appl. No. PCT/US2006/036156, filed 18 Sep. 2006; U.S. Appl. No. 60/718,393, filed 19 Sep. 2005; U.S. Appl. No. 60/718,581, filed 19 Sep. 2005; U.S. Appl. No. 60/718,899, filed 20 Sep. 2005; U.S. Appl. No. 60/728,928, filed 20 Oct. 2005; and U.S. Appl. No. 60/728,929 filed, 20 Oct. 2005; and U.S. application Ser. No. 10/351,664 filed, 27 Jan. 2003 now U.S. Pat. No. 8,041,436 that claims priority to U.S. Appl. No. 60/373,404, filed 18 Apr. 2002. This application is also a continuation of U.S. application Ser. No. 12/195,353, filed on 20 Aug. 2008, and issued as U.S. Pat. No. 8,180,464 on 15 May 2012.

This work was supported at least in part by NASA under NASA contract number GT3-52387. Accordingly, the United States government may have certain rights herein.

TECHNICAL FIELD

The subject matter described herein relates to controllers, systems, and methods for feedback control of various systems.

BACKGROUND

A feedback (closed-loop) control system 10, as shown in Prior Art FIG. 1, is widely used to modify the behavior of a physical process, denoted as the plant 110, so it behaves in a specific desirable way over time. For example, it may be desirable to maintain the speed of a car on a highway as close as possible to 60 miles per hour in spite of possible hills or adverse wind; or it may be desirable to have an aircraft follow a desired altitude, heading and velocity profile independently of wind gusts; or it may be desirable to have the temperature and pressure in a reactor vessel in a chemical process plant maintained at desired levels. All of these industrial tasks are accomplished today by using traditional feedback control, and the above are examples of what automatic control systems are designed to do, without human intervention.

The key component in a feedback control system is the controller 120, which determines the difference between the output "y" of the plant 110, (e.g., the temperature or position) and its desired value, and produces a corresponding control signal "u" (e.g., modulating the power input to a heater or motor).

The goal of controller design is to make the difference between the actual output of the plant and the desired output as small as possible as rapidly as possible. Today, controllers are employed in a large number of industrial control applications and in areas like robotics, aeronautics, astronautics, motors, motion control and thermal control, just to name a few.

INDUSTRIAL APPLICABILITY

The present system and method has potential applicability to a wide range of different industrial and commercial applications. The following brief synopsis is intended only to provide background on some exemplary applications to assist a person of ordinary skill in the art in understanding this disclosure more fully. Additional background information on a select number of exemplary industrial applications are also provided.

BACKGROUND OF THE INVENTION

Classic Control Theory provides a number of techniques for an engineer to use in controller design. Existing controllers for linear, time invariant, and single-input single-output plants are categorized in one taxonomy into three forms: the proportional/integral/derivative (PID) controllers, transfer function based (TFB) controllers, and state feedback (SF) controllers. The PID controller is defined by the equation:

$$u = K_p e + K_i \int e + K_D \dot{e} \qquad \text{Equation (1)}$$

where (u) is the control signal and (e) is the error between the set point and the process output (y) being controlled. As commonly used, the notation of a dot (•) above a variable indicates the use of a derivative of the variable where the order corresponds to the number of dots.

The PID-type of controller has been employed in engineering and other applications since the early 1920s. It is an error-based controller that does not require an explicit mathematical model of the plant 110.

Transfer Function Based Controller

The transfer function based (TFB) controller is given in the form of $$U(s) = G_c(s) E(s) \qquad \text{Equation (2)}$$

$$G_c(s) = \frac{n(s)}{d(s)}$$

where U(s) and E(s) are Laplace Transforms of u and e defined above, and n(s) and d(s) are polynomials in s. The TFB controller can be designed using methods in control theory based on the transfer function model of the plant, Gp(s). A PID controller can be considered a special case of a TFB controller because it has an equivalent transfer function of s.

$$G_c(s) = k_p + \frac{k_i}{s} + k_d s \qquad \text{Equation (3)}$$

State Feedback (SF) Controller

The State Feedback (SF) controller can be defined by $$u = r + Kx \qquad \text{Equation (4)}$$

where u is the control input, r is the setpoint for the output to follow and x is the state vector associated with the system, based on the state space model of the plant 110:

$$\dot{x}(t) = Ax(t) + Bu(t) \qquad \text{Equation (5)}$$

$$y(t) = Cx(t) + Du(t) \qquad \text{Equation (6)}$$

where x(t) is the state vector, y(t) is the output vector, u(t) is the input or control vector, A is the state matrix, B is the input matrix, C is the output matrix and D is the feed-through matrix. When the state x is not accessible, a state observer (SO):

$$\dot{\hat{x}} = A\hat{x} + Bu + L(y - \hat{y}) \qquad \text{Equation (7)}$$

is usable to estimate the state x, where the (^) symbol is used to denote an estimate or observed value of a given variable and L denotes the observer coefficient matrix.

State Observers

Observers extract real-time information of a plant's 110 internal state from its input-output data. The observer usually presumes precise model information of the plant 110, since performance is largely based on its mathematical accuracy. Most prior art closed loop controllers require both types of information. Such presumptions, however, often make the method impractical in engineering applications, since the challenge for industry remains in constructing these models as part of the design process. Another level of complexity is added when gain scheduling and adaptive techniques are used to deal with nonlinearity and time variance, respectively.

Disturbance Observers and Disturbance Rejection

Recently, disturbance rejection techniques have been used to account for uncertainties in the real world and successfully control complex nonlinear systems. The premise is to solve the problem of model accuracy in reverse by modeling a system with an equivalent input disturbance d that represents any difference between the actual plant P and a derived/selected model $P_n$ of the plant, including external disturbances w. An observer is then designed to estimate the disturbance in real time and provide feedback to cancel it. As a result, the augmented system acts like the model $P_n$ at low frequencies, making the system behave like $P_n$ and allowing a controller to be designed for $P_n$.

The most common of these techniques is the disturbance observer (DOB) structure (Endo, S., H. Kobayashi, C J. Kempf, S. Kobayashi, M. Tomizuka and Y. Hori (1996). "Robust Digital Tracking Controller Design for High-Speed Positioning Systems." *Control Eng. Practice,* 4:4, 527-536; Kim, B. K., H.-T. Choi, W. K. Chung and I. H. Suh (2002). "Analysis and Design of Robust Motion Controllers in the Unified Framework." *J. of Dynamic Systems, Measurement, and Control,* 124, 313-321; Lee, H. S. and M. Tomizuka (1996). "Robust Motion Controller Design for High-Accuracy Positioning Systems." *IEEE Trans. Ind. Electron.,* 43:1, 48-55; Tesfaye, A., H. S. Lee and M. Tomizuka (2000). "A Sensitivity Optimization Approach to Design of a Disturbance Observer in Digital Motion Control." *IEEE/ASME Trans, on Mechatronics,* 5:1, 32-38; Umeno, T. and Y. Hori (1991). "Robot Speed Control of DC Servomotors Using Modern Two Degrees of-Freedom Controller Design". *IEEE Trans. Ind. Electron.,* 38:5, 363-368). It uses a disturbance observer consisting of a binomial Q-filters and the inverse model of the plant. And the controller is called parameterized in the sense that the Q-filter is treated as a parameter. A model deliberately different from P is suggested in E. Schrijver and J. Van Dijk, "Disturbance Observers for Rigid Mechanical Systems: Equivalence, Stability, and Design," *Journal of Dynamic Systems, Measurement, and Control,* vol. 124, no. 4, pp. 539-548, 2002 to facilitate design, but no guidelines are given other than it should be as simple as possible, while cautioning stability and performance may be in danger if the model is significantly different from the plant. Another obstacle is that a separate state observer must be designed to provide state feedback to the controller. In existing research, derivative approximates are used in this way but their effect on performance and stability is questionable. Furthermore, the controller design is dependent on the DOB design, meaning that derivative approximates can not be arbitrarily selected.

Multiple DOBs were used to control a multivariable robot by treating it as a set of decoupled single-input single-output (SISO) systems, each with disturbances that included the coupled dynamics (Bickel, R. and M. Tomizuka (1999). "Passivity-Based Versus Disturbance Observer Based Robot Control: Equivalence and Stability." *J. of Dynamic Systems, Measurement, and Control,* 121, 41-47; Hori, Y., K. Shimura and M. Tomizuka (1992). "Position/Force Control of Multi-Axis Robot Manipulator Based on the TDOF Robust Servo Controller For Each Joint." *Proc. of ACC,* 753-757; Kwon, S. J. and W. K. Chung (2002). "Robust Performance of the Multiloop Perturbation Compensator." *IEEE/ASME Trans. Mechatronics,* 7:2, 190-200; Schrijver, E. and J. Van Dijk (2002) Disturbance Observers for Rigid Mechanical Systems: Equivalence, Stability, and Design." *J. of Dynamic Systems, Measurement, and Control,* 124, 539-548.)

Another technique, referred to as the unknown input observer (UIO), estimates the states of both the plant and the disturbance by augmenting a linear plant model with a linear disturbance model (Burl, J. B. (1999). *Linear Optimal Control,* pp. 308-314. Addison Wesley Longman, Inc., California; Franklin, G. F., J. D. Powell and M. Workman (1998). *Digital Control of Dynamic Systems,* Third Edition, Addison Wesley Longman, California; Johnson, CD. (1971). "Accommodation of External Disturbances in Linear Regulator and Servomechanism Problems." *IEEE Trans. Automatic Control,* AC-16:6, 635-644; Liu, C-S., and H. Peng (2002). "Inverse-Dynamics Based State and Disturbance Observer for Linear Time-Invariant Systems." *J. of Dynamic Systems, Measurement, and Control,* 124, 375-381; Profeta, J. A. III, W. G. Vogt and M. H. Mickle (1990). "Disturbance Estimation and Compensation in Linear Systems." *IEEE Trans. Aerospace and Electronic Systems,* 26:2, 225-231; Schrijver, E. and J. Van Dijk (2002) "Disturbance Observers for Rigid Mechanical Systems: Equivalence, Stability, and Design." *J. of Dynamic Systems, Measurement, and Control,* 124, 539-548). Unlike the DOB structure, the controller and observer can be designed independently, like a Luenberger observer. However, it still relies on a good mathematical model and a design procedure to determine observer gains. An external disturbance w is generally modeled using cascaded integrators ($1/s^h$). When they are assumed to be piece-wise constant, the observer is simply extended by one state and still demonstrates a high degree of performance.

Extended State Observer (ESO)

In this regard, the extended state observer (ESO) is quite different. Originally proposed by Han, J. (1999). "Nonlinear Design Methods for Control Systems." *Proc. 14th IFAC World Congress,* in the form of a nonlinear UIO and later simplified to a linear version with one tuning parameter by Gao, Z. (2003). "Scaling and Parameterization Based Controller Tuning." *Proc. of ACC,* 4989-4996, the ESO combines the state and disturbance estimation power of a UIO with the simplicity of a DOB. One finds a decisive shift in the underlying design concept as well. The traditional observer is based on a linear time-invariant model that often describes a nonlinear time-varying process. Although the DOB and UIO reject input disturbances for such nominal plants, they leave the question of dynamic uncertainty mostly unanswered. The ESO, on the other hand, addresses both issues in one simple framework by formulating the simplest possible design model $P_d=1/s^n$ for a large class of uncertain systems. The design model $P_d$ is selected to simplify controller and observer design, forcing P to behave like the design model $P_d$ at low frequencies rather than $P_n$. As a result, the effects of most plant dynamics and external disturbances are concentrated into a single unknown quantity. The ESO estimates this quantity along with derivatives of the output, giving way to the straightforward design of a high performance, robust, easy to use and affordable industrial controller.

Active Disturbance Rejection Control (ADRC)

Originally proposed by Han, J. (1999). "Nonlinear Design Methods for Control Systems." *Proc. 14th IFAC World Congress*, a nonlinear, non-parameterized active disturbance rejection control (ADRC) is a method that uses an ESO. A linear version of the ADRC controller and ESO were parameterized for transparent tuning by Gao, Z. (2003). "Scaling and Parameterization Based Controller Tuning." *Proc. of ACC*, 4989-4996. Its practical usefulness is seen in a number of benchmark applications already implemented throughout industry with promising results (Gao, Z., S. Hu and F. Jiang (2001). "A Novel Motion Control Design Approach Based on Active Disturbance Rejection." *Proc. of 40th IEEE Conference on Decision and Control*; Goforth, F. (2004). "On Motion Control Design and Tuning Techniques." *Proc. of ACC*; Hu, S. (2001). "On High Performance Servo Control Solutions for Hard Disk Drive." Doctoral Dissertation, Department of Electrical and Computer Engineering, Cleveland State University; Hou, Y., Z. Gao, F. Jiang and B. T. Boulter (2001). "Active Disturbance Rejection Control for Web Tension Regulation." *Proc. of 40th IEEE Conf. on Decision and Control*; Huang, Y., K. Xu and J. Han (2001). "Flight Control Design Using Extended State Observer and Nonsmooth Feedback." *Proc. of 40th IEEE Conf. on Decision and Control*; Sun, B and Z. Gao (2004). "A DSP-Based Active Disturbance Rejection Control Design for a 1 KW H-Bridge DC-DC Power Converter." *IEEE Trans. on Ind. Electronics*; Xia, Y., L. Wu, K. Xu, and J. Han (2004). "Active Disturbance Rejection Control for Uncertain Multivariable Systems With Time-Delay, 2004 Chinese Control Conference. It also was applied to a fairly complex multivariable aircraft control problem (Huang, Y., K. Xu and J. Han (2001). "Flight Control Design Using Extended State Observer and Nonsmooth Feedback. *Proc. of 40th IEEE Conf. on Decision and Control*).

What is needed is a control framework for application to systems throughout industry that are complex and largely unknown to the personnel often responsible for controlling them. In the absence of required expertise, less tuning parameters are needed than current approaches, such as multi-loop PID, while maintaining or even improving performance and robustness.

INDUSTRIAL APPLICATION

A selection of industrial applications is presented herein to provide a background on some selected applications for the present extended active disturbance rejection controller.
Tracking Control Tracking Control refers to the output of a controlled system meeting design requirements when a specified reference trajectory is applied. Oftentimes, it refers to how closely the output y compares to the reference input r at any given point in time. This measurement is known as the error $e=r-y$.

Control problems are categorized in two major groups; point-to-point control and tracking control. Point-to-point applications usually call for a smooth step response with small overshoot and zero steady state error, such as when controlling linear motion from one position to the next and then stopping. Since the importance is placed on destination accuracy and not on the trajectory between points, conventional design methods produce a bandwidth limited controller with inherent phase lag in order to produce a smooth output. Tracking applications require a good tracking of a reference input by keeping the error as small as possible at all times, not just at the destination. This is particularly common in controlling a process that never stops. Since the importance is placed on accurately following a changing reference trajectory between points, phase lags are avoided as much as possible because they may lead to significant errors in the transient response, which lasts for the duration of the process in many applications. A common method of reducing phase lag is to increase the bandwidth, at the cost of increased control effort (energy) and decreased stability margin.

Various methods have been used to remove phase lag from conventional control systems. All of them essentially modify the control law to create a desired closed loop transfer function equal to one. As a result, the output tracks the reference input without much phase lag and the effective bandwidth of the overall system is improved. The most common method is model inversion where the inverse of the desired closed loop transfer function is added as a prefilter. Another method proposed a Zero Phase Error Tracking Controller (ZPETC) that cancels poles and stable zeros of the closed loop system and compensates for phase error introduced by un-cancelable zeros. Although it is referred to as a tracking controller, it is really a prefilter that reduces to the inverse of the desired closed loop transfer function when unstable zeros are not present. Other methods consist of a single tracking control law with feed forward terms in place of the conventional feedback controller and prefilter, but they are application specific. However, all of these and other previous methods apply to systems where the model is known.

Model inaccuracy can also create tracking problems. The performance of model-based controllers is largely dependent on the accuracy of the model. When linear time-invariant (LTI) models are used to characterize nonlinear time-varying (NTV) systems, the information becomes inaccurate over time. As a result, gain scheduling and adaptive techniques are developed to deal with nonlinearity and time variance, respectively. However, the complexity added to the design process leads to an impractical solution for industry because of the time and level of expertise involved in constructing accurate mathematical models and designing, tuning, and maintaining each control system.

There have been a number of high performance tracking algorithms that consist of three primary components: disturbance rejection, feedback control, and phase lag compensation implemented as a prefilter. First, disturbance rejection techniques are applied to eliminate model inaccuracy with an inner feedback loop. Next, a stabilizing controller is constructed based on a nominal model and implemented in an outer feedback loop. Finally, the inverse of the desired closed loop transfer function is added as a prefilter to eliminate phase lag. Many studies have concentrated on unifying the disturbance rejection and control part, but not on combining the control and phase lag compensation part, such as the RIC framework. Internal model control (IMC) cancels an equivalent output disturbance. B. Francis and W. Wonham, "The Internal Model Principal of Control Theory," *Automatica*, vol 12, 1976, pp. 457-465. E. Schrijver and J. Van Dijk, "Disturbance Observers for Rigid Mechanical Systems: Equivalence, Stability, and Design," *Journal of Dynamic Systems, Measurement, and Control*, vol. 124, December 2002, pp. 539-548 uses a basic tracking controller with a DOB to control a multivariable robot. The ZPETC has been widely used in combination with the DOB framework and model based controllers.

Thus, having reviewed prior art in tracking control, the application now describes example systems and methods of tracking control employing predictive ADRC.
Web Processing Applications Web tension regulation is a challenging industrial control problem. Many types of material, such as paper, plastic film, cloth fabrics, and even strip steel are manufactured or processed in a web form. The quality of the end product is often greatly affected by the web tension, making it a crucial variable for feedback control design, together with the velocities at the various stages in the manufacturing process. The ever-increasing demands on the quality and efficiency in industry motivate researchers and engineers alike to explore better methods for tension and velocity control. However, the highly nonlinear nature of the web handling process and changes in operating conditions (temperature, humidity, machine wear, and variations in raw materials) make the control problem challenging.

Accumulators in web processing lines are important elements in web handling machines as they are primarily responsible for continuous operation of web processing lines. For this reason, the study and control of accumulator dynamics is an important concern that involves a particular class of problems. The characteristics of an accumulator and its operation as well as the dynamic behavior and control of the accumulator carriage, web spans, and tension are known in the art.

Both open-loop and closed-loop methods are commonly used in web processing industries for tension control purposes. In the open-loop control case, the tension in a web span is controlled indirectly by regulating the velocities of the rollers at either end of the web span. An inherent drawback of this method is its dependency on an accurate mathematical model between the velocities and tension, which is highly nonlinear and highly sensitive to velocity variations. Nevertheless, simplicity of the controller outweighs this drawback in many applications. Closing the tension loop with tension feedback is an obvious solution to improve accuracy and to reduce sensitivity to modeling errors. It requires tension measurement, for example, through a load cell, but is typically justified by the resulting improvements in tension regulation.

Most control systems will unavoidably encounter disturbances, both internal and external, and such disturbances have been the obstacles to the development of high performance controller. This is particularly true for tension control applications and, therefore, a good tension regulation scheme must be able to deal with unknown disturbances. In particular, tension dynamics are highly nonlinear and sensitive to velocity variations. Further, process control variables are highly dependent on the operating conditions and web material characteristics. Thus, what are needed are systems and methods for control that are not only overly dependent on the accuracy of the plant model, but also suitable for the rejection of significant internal and external disturbances.

Jet Engine Control Applications

A great deal of research has been conducted towards the application of modern multivariable control techniques on aircraft engines. The majority of this research has been to control the engine at a single operating point. Among these methods are a multivariable integrator windup protection scheme (Watts, S. R. and S. Garg (1996). "An Optimized Integrator Windup Protection Technique Applied to a Turbofan Engine Control," *AIAA Guidance Navigation and Control Conf.*), a tracking filter and a control mode selection for model based control (Adibhatla S. and Z. Gastineau (1994). "Tracking Filter Selection And Control Mode Selection For Model Based Control." AIAA 30th Joint Propulsion Conference and Exhibit), an $H_\infty$ method and linear quadratic Gaussian with loop transfer recovery method (Watts, S. R. and S. Garg (1995)." A Comparison Of Multivariable Control Design Techniques For A Turbofan Engine Control." *International Gas Turbine and Aeroengine Congress and Expo.*), and a performance seeking control method (Adibhatla, S. and K. L. Johnson (1993). "Evaluation of a Nonlinear Psc Algorithm on a Variable Cycle Engine." *AIAA/SAE/ASME/ASEE 29th Joint Propulsion Conference and Exhibit*). Various schemes have been developed to reduce gain scheduling (Garg, S. (1997). "A Simplified Scheme for Scheduling Multivariable Controllers." *IEEE Control Systems*) and have even been combined with integrator windup protection and $H_2$ (Frederick, D. K., S. Garg and S. Adibhatla (2000). "Turbofan Engine Control Design Using Robust Multivariable Control Technologies. *IEEE Trans. on Control Systems Technology*).

Conventionally, there have been a limited number of control techniques for full flight operation (Garg, S. (1997). "A Simplified Scheme for Scheduling Multivariable Controllers." *IEEE Control Systems*; and Polley, J. A., S. Adibhatla and P J. Hoffman (1988). "Multivariable Turbofan Engine Control for Full Conference on Decision and Control Flight Operation." *Gas Turbine and Expo*). However, there has been no development of tuning a controller for satisfactory performance when applied to an engine. Generally, at any given operating point, models can become inaccurate from one engine to another. This inaccuracy increases with model complexity, and subsequently design and tuning complexity. As a result, very few of these or similar aircraft design studies have led to implementation on an operational vehicle.

The current method for controlling high performance jet engines remains multivariable proportional-integral (PI) control (Edmunds, J. M. (1979). "Control System Design Using Closed-Loop Nyquist and Bode Arrays." *Int. J. on Control*, 30:5, 773-802, and Polley, J. A., S. Adibhatla and P J. Hoffman (1988). "Multivariable Turbofan Engine Control for Full Conference on Decision and Control. Flight Operation." *Gas Turbine and Expo*). Although the controller is designed by implementing Bode and Nyquist techniques and is tunable, a problem remains due to the sheer number of tuning parameters compounded by scheduling.

SUMMARY OF INVENTION

The present system, method, process, and device for controlling systems is applicable for a variety of different application and has utility in a number of different industrial fields. The following brief summary section is provided to facilitate a basic understanding of the nature and capabilities of the present system and method. This summary section is not an extensive nor comprehensive overview and is not intended to identify key or critical elements of the present systems or methods or to delineate the scope of these items. Rather this brief summary is intended to provide a conceptual introduction in simplified form as an introduction for the more detailed description presented later in this document.

The present application describes selected embodiments of the ADRC controller that comprise one or more computer components, that extend, build upon and enhance the use of ADRC controllers and provide enhanced performance and utility. Specifically, in one aspect the ADRC controller utilizes a predictive computer component or module that in one embodiment predicts future values of the plant output and in a second embodiment predicts future estimates of the system state and generalized disturbance. The generalized disturbance includes dynamics of the plant itself such that the plant is effectively reduced to a cascaded integral plant. In the various embodiments a variety of estimates are available and introduced.

In still another aspect, the ADRC controller further includes a model of the plant dynamics. The model is used in one embodiment to improve the state estimator or predictor. In a second embodiment the model is used to provide an enhanced control law that provides improved performance. In both aspects of the embodiments discussed in this paragraph, the generalized disturbance captures model errors and discrepancies and allows the system to eliminate errors caused by model errors, discrepancies, and assumptions. In the multiple embodiments, a variety of models are available for use by one of ordinary skill in the art to achieve the desired performance relative to the type of plant being controlled.

In yet another aspect, the ADRC controller further includes a non-linear, or discrete time optimal control law. The non-linear control law of the present embodiment utilizes non-linear control laws to improve the overall performance of an ADRC controller as compared to an ADRC controller with a linear proportional-derivative based control law.

In still another aspect, additional knowledge of derivative plant output gathered from high quality sensor information or direct measurement sensors (e.g. velocity and acceleration sensors) is used to reduce the order of the system state and disturbance estimator.

BRIEF DESCRIPTION OF THE DRAWINGS

The accompanying figures depict multiple embodiments of a device and method for the separation of constituents from a flow. A brief description of each figure is provided below. Elements with the same reference numbers in each figure indicate identical or functionally similar elements. Additionally, the left-most digit(s) of a reference number identifies the drawings in which the reference number first appears.

Figure 1:
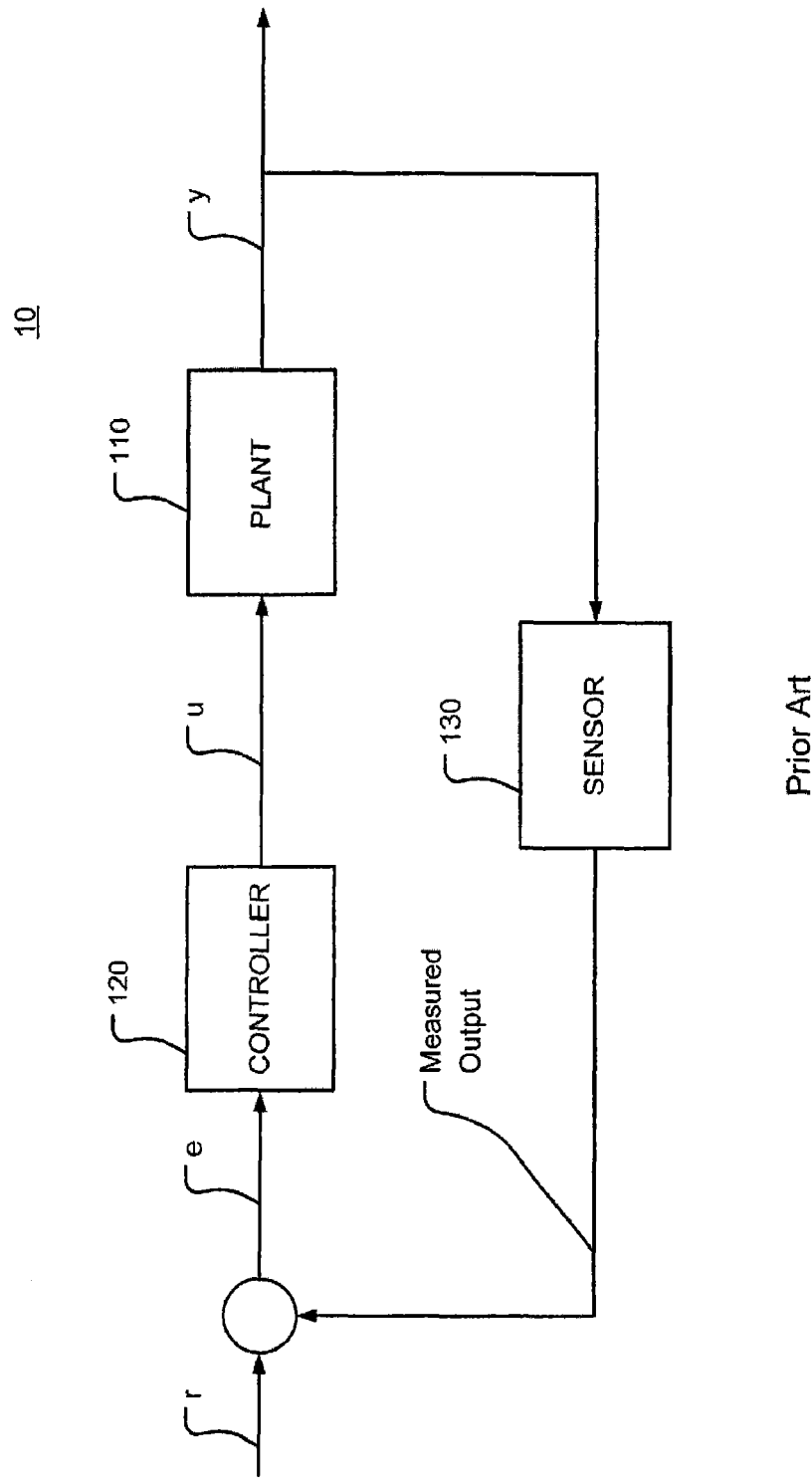
FIG. 1 is a block diagram of a Prior Art feedback controller.

The present invention is described with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved, including for example executing as asynchronous threads on a processor. Although some of the diagrams include arrows on communication paths to show a primary direction of communication, it is to be understood that communication may occur in the opposite direction to the depicted arrows.

DETAILED DESCRIPTION

Multiple embodiments of a system, device, and method for the control of systems are presented herein. Those of ordinary skill in the art can readily use this disclosure to create alternative embodiments using the teaching contained herein.

Lexicon

The following terms used herein have the meanings as follows.

As used herein the term "computer component" refers to a computer and elements of a computer, such as hardware, firmware, software, a combination thereof, or software in execution. For example, a computer component can include by way of example, a process running on a processor, a processor, an object, an executable, an execution thread, a program, and a computer itself. One or more computer components can in various embodiments reside on a server and the server can be comprised of multiple computer components. One or more computer components are in some cases referred to as computer systems whereby one or more computer components operate together to achieve some functionality. One or more computer components can reside within a process and/or thread of execution and a computer component can be localized on one computer and/or distributed between two or more computers.

"Software", as used herein, includes but is not limited to, one or more computer readable and/or executable instructions that cause a computer or other electronic device to perform functions, actions and/or behave in a desired manner. The instructions may be embodied in various forms like routines, algorithms, modules, methods, threads, and/or programs. Software may also be implemented in a variety of executable and/or loadable forms including, but not limited to, a stand-alone program, a function call (local and/or remote), a servelet, an applet, instructions stored in a memory, part of an operating system or browser, and the like. It is to be appreciated that the computer readable and/or executable instructions can be located in one computer component and/or distributed between two or more communicating, co-operating, and/or parallel processing computer components and thus can be loaded and/or executed in serial, parallel, massively parallel and other manners. It will be appreciated by one of ordinary skill in the art that the form of software may be dependent on, for example, requirements of a desired application, the environment in which it runs, and/or the desires of a designer/programmer or the like.

"Computer communications", as used herein, refers to a communication between two or more computers and can be, for example, a network transfer, a file transfer, an applet transfer, an email, a hypertext transfer protocol (HTTP) message, a datagram, an object transfer, a binary large object (BLOB) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

An "operable connection" is one in which signals and/or actual communication flow and/or logical communication flow may be sent and/or received. Usually, an operable connection includes a physical interface, an electrical interface, and/or a data interface, but it is to be noted that an operable connection may consist of differing combinations of these or other types of connections sufficient to allow operable control.

As used herein, the term "signal" may take the form of a continuous waveform and/or discrete value(s), such as digital value(s) in a memory or register, present in electrical, optical or other form.

The term "controller" as used herein indicates a method, process, or computer component adapted to control a plant (i.e. the system to be controlled) to achieve certain desired goals and objectives.

As used herein the following symbols are used to describe specific characteristics of the variable. A variable with a "^" overtop the variable label, unless other indicated to the contrary, indicates that the variable is an estimate of the actual variable of the same label. A variable with a "" overtop the variable label, unless otherwise indicated, indicates that the variable is an nth derivative of that variable, where n equals the number of dots.

To the extent that the term "includes" is employed in the detailed description or the claims, it is intended to be inclusive in a manner similar to the term "comprising" as that term is interpreted when employed as a transitional word in a claim.

To the extent that the term "or" is employed in the claims (e.g., A or B) it is intended to mean "A or B or both". When the author intends to indicate "only A or B but not both", then the author will employ the term "A or B but not both". Thus, use of the term "or" in the claims is the inclusive, and not the exclusive, use.

Active Disturbance Rejection Control (ADRC)

Active Disturbance Rejection Control ("ADRC") is a method or process and, when embedded within a computer system, a device (i.e., a controller that processes information and signals using the ADRC algorithms), that effectively rejects both unknown internal dynamics of a system of an arbitrary order to be controlled, or plant 110, and external disturbances in real time without requiring detailed knowledge of the plant 110 dynamics, which is required by most existing control design methods.

The only information needed to configure an ADRC controller is knowledge of the relative order of the plant 110 and the high frequency gain of the plant 110. In comparison, traditional model-based control methods require accurate mathematical models to conform with prevailing model-based design methods. In some embodiments, the ADRC controller leverages knowledge gained from model-based controller designs to improve control performance. The ADRC approach is unique in that it first forces an otherwise nonlinear, time-varying and uncertain plant 110 to behave as a simple linear cascade integral plant that can be easily controlled. To this end, the unknown, nonlinear, and time-varying internal dynamics is combined with the external disturbances to form what is denoted as the generalized disturbance, which is then estimated and rejected, thus greatly simplifying the control design.

The embodiments of the ADRC controller design are founded on the basic theory that uncertainties in dynamics and unknown external disturbances in the operating environment are a key challenge to be dealt with in control engineering practice. Traditional control systems are incapable of providing a solution to controlling and mitigating the impact of these uncertainties. The ADRC controller in contrast is specifically adapted to mitigate and eliminate the impact of these uncertainties, thus providing a dynamically simplified system for control.

One previous major characteristic of the ADRC controller is the parameterization of the controller as a function of control loop bandwidth. This parameterization makes all of the ADRC controller parameters functions of the control loop bandwidth; see, U.S. patent application Ser. No. 10/351,664, titled, "Scaling and Parameterizing A Controller" to Zhiqiang Gao, which is hereby incorporated by reference in its entirety.

Figure 2:
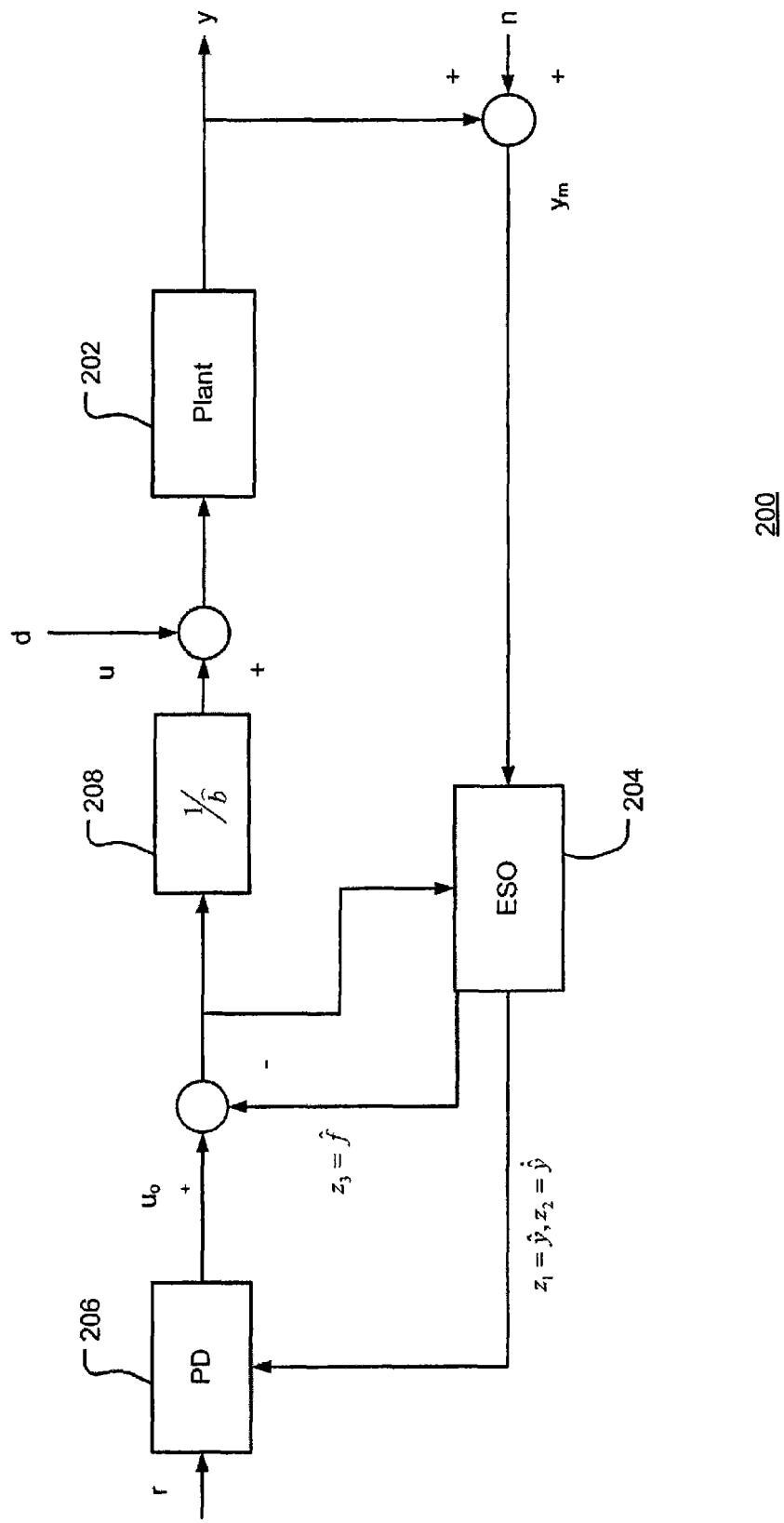
FIG. 2 is a block diagram of an ADRC configuration for a 2nd order plant.

An embodiment of a parameterized ADRC controller applied to a second-order plant 202 is illustrated in FIG. 2. The system to be controlled is a second-order plant 202 and represents an arbitrary plant 110 with predominantly second-order dynamics. The second-order plant 202 has an output (y) in response to an input that comprises a control signal (u) with superimposed external disturbances (d).

Consider a general uncertain, nonlinear and time-varying second-order plant 202 of the form:

$$\ddot{y}=f(y,\dot{y},d,t)+bu \qquad \text{Equation (8)}$$

where y is system output, u is the control signal, b is a constant, d is external input disturbance, $f(y,\dot{y},d,t)$ is treated as the generalized disturbance. When this generalized disturbance is cancelled, the system is reduced to a simple double-integral plant with a scaling factor b, which can be easily controlled. Here we assume that the approximate value of b, denoted as $\hat{b}$, is given or estimated. As shown in FIG. 2, the scaling factor ($\hat{b}$) is used to scale 208, the control output (uft). In other embodiments, the scaling factor is implicit within the linear PD control law 206.

To capture the information of the generalized disturbance $f(y,\dot{y},d,t)$ and cancel it from the system dynamics leads us to the Extended State Observer (ESO) 204, which is now presented. Let $x_1=y$, $x_2=\dot{y}$, and $x_3=f$, the description of the above plant 202 is rewritten in state space form with $f(y,\dot{y},d,t)$, or simply f, treated as an additional state:

$$\begin{cases} \dot{x} = A_x x + B_x u + E\dot{f} \\ y = C_x x \end{cases} \qquad \text{Equation (9)}$$

where $$A_x = \begin{bmatrix} 0 & 1 & 0 \\ 0 & 0 & 1 \\ 0 & 0 & 0 \end{bmatrix}, B_x = \begin{bmatrix} 0 \\ b \\ 0 \end{bmatrix}, E = \begin{bmatrix} 0 \\ 0 \\ 1 \end{bmatrix}, C_x = [1 \ 0 \ 0]$$

The corresponding state observer is $$\begin{cases} \dot{z} = A_x z + B_z u + L(y_m - C_x z) \\ \hat{f} = Vz \end{cases} \qquad \text{Equation (10)}$$

where $y_m$ is the measured system output, $B_z=[0 \ \hat{b} \ 0]^T$, $V=[0 \ 0 \ 1]$, and $L=[l_1 \ l_2 \ l_3]^T$ is the observer gain vector. With the parameterization technique as described more fully in U.S. patent application Ser. No. 10/351,664, L is obtained by solving the equation $\lambda(s)=|sI-A_x+LC_x|=(s+\omega_o)^3$; that is, all the eigenvalues of the observer are placed at $-\omega_o$ with $$l_1=3\omega_o, l_2=3\omega_o^2, l_3=\omega_o^3 \qquad \text{Equation (11)}$$

With a well-tuned extended state observer 204, $z_1$, $z_2$, and $z_3$ will closely track y, $\dot{y}$, and f respectively, i.e. $z_1 \approx y$, $z_2 \approx \dot{y}$, and $z_3 \approx f$ Using the information provided by the extended state observer 204, the generalized disturbance f is rejected by the control law $$u=(u_0-z_3)/\hat{b} \qquad \text{Equation (12)}$$

which reduces the plant 110 to a unity gain, double integral plant $$\ddot{y}=u_o \qquad \text{Equation (13)}$$

that can be easily controlled with linear proportional-derivative (PD) with feedforward $$u_o=g_{pd}(e,\dot{e},\omega_c)+\ddot{r} \qquad \text{Equation (14)}$$

where $g_{pd}(e,\dot{e},\omega_c)$ is the parameterized linear PD controller with the loop bandwidth of $\omega_c$ $$g_{pd}(e,\dot{e},\omega_c)=\omega_c^2 e+2\omega_c \dot{e} \qquad \text{Equation (15)}$$

with the error term defined as $$e=r-z_1, \dot{e}=\dot{r}-z_2 \qquad \text{Equation (16)}$$

where the desired trajectory (r) is provided by the user.

Note that the linear PD control law 206 in Equation (14) corresponds to the common PD gains of $$k_p=\omega_c^2 \text{ and } k_d=2\omega_c \qquad \text{Equation (17)}$$

Using these details, the ADRC controller is generalized in its various embodiments to control an arbitrary $n^{th}$-order system $y^{(n)}=f(y,\dot{y}, \ldots, y^{(n-1)},d,t)+bu$, in which the external disturbances and unknown internal dynamics are rejected. In a similar manner, the plant 110 is reduced to a cascaded integral plant $y^{(n)}=u$, which is then controlled by a generalized proportional-derivative (PD) control law, also described as a linear PD control law 206 similar to Equation (14).

Use of Enhanced Sensor Information to Improve Control Performance

In other embodiments of the ADRC controller, the linear PD control law 206 is updated to enhance performance by using direct measurement of the system output states ($y_m$) instead of the estimated states ($z_1$, $z_2$). Specifically, when the measured output $y_m(t)$ is sufficiently noise free and $\dot{y}_m(t)$ is obtainable, either via direct measurement or from $y_m(t)$, the control law in Equation (14) can be implemented with $$e=r-y_m, \dot{e}=\dot{r}-\dot{y}_m \qquad \text{Equation (18)}$$

That is, the output measurement and its derivative are used in the control law, instead of their estimates, $z_1$ and $z_2$. Similarly for the $n^{th}$-order plant 110, the output measurement $y_m$ and its derivatives from the $1^{st}$ to the $(n-1)^{th}$-order available, can also be used directly in the PD control law, also referred to as the linear PD control law 206, instead of their estimates from the Extended State Observer (ESO) 204. Using the direct measurement of the output measurement state $y_m$ and its derivatives reduces the phase lag and improve control system performance, if the output measurement and its derivatives are not corrupted by noise.

Multiple Extended States

The Extended State Observer 204 in alternative embodiments includes more than one extended states, such as embodiments where the 2nd order plant 202 is replaced with a higher order plant 110. In one embodiment, when augmented with two extended states, $x_3=f$ and $x_4=\dot{f}$, the extended plant state space model can be written as follows.

$$\begin{cases} \dot{x} = A_x x + B_x u + E\dot{f} \\ y = C_x x \end{cases} \qquad \text{Equation (19)}$$

where $$A_x = \begin{bmatrix} 0 & 1 & 0 & 0 \\ 0 & 0 & 1 & 0 \\ 0 & 0 & 0 & 1 \\ 0 & 0 & 0 & 0 \end{bmatrix}, B_x = \begin{bmatrix} 0 \\ b \\ 0 \\ 0 \end{bmatrix}, E = \begin{bmatrix} 0 \\ 0 \\ 0 \\ 1 \end{bmatrix}, C_x = [1 \ 0 \ 0 \ 0]$$

With $z_1$, $z_2$, $z_3$, and $z_4$ tracking $x_1$, $x_2$, $x_3$, and $x_4$ respectively, the $4^{th}$-order ESO 204 is employed to estimate f.

$$\begin{cases} \dot{z} = A_x z + B_z u + L(y_m - C_x z) \\ \hat{f} = Vz \end{cases} \qquad \text{Equation (20)}$$

where $B_z=[0 \ \hat{b} \ 0 \ 0]^T$ and $V=[0 \ 0 \ 1 \ 0]$.

In this manner, any embodiment of an ADRC controller is adaptable for use with an arbitrary number (h) extended state observer states with is generalized to control an $n^{th}$-order system.

Discrete Implementation

ADRC algorithms are implemented in discrete time, with ESO 204 discretized in both Euler and ZOH, and in both the current estimator and predictive estimator form.

In discrete implementation, the ESO 204 pole location is determined in the Z domain by solving the equation $\lambda(z)=|zI-\phi+L_pC_x|=(z-\beta)^3$, where $\beta=e^{-\omega_o T}$.

Predictive Discrete Extended State Observer (PDESO) is in predictive estimator form, as shown in the following equation.

$$\begin{cases} z[k+1] = \Phi z[k] + \Gamma u[k] + L_p(y_m[k] - z_1[k]) \\ \bar{z}[k] = z[k] \end{cases} \qquad \text{Equation (21)}$$

Current Discrete Extended State Observer (CDESO) is in current estimator form, as shown in the following equation.

$$\begin{cases} z[k+1] = \Phi z[k] + \Gamma u[k] + L_p(y_m[k] - z_1[k]) \\ \bar{z}[k] = z[k] + L_c(y_m[k] - z_1[k]) \end{cases} \qquad \text{Equation (22)}$$

The gain matrices of different ADRC discrete implementations are shown in the following Table I.

TABLE I

| | PDESO AND CDESO COEFFICIENT MATRICES | | | |
|---|---|---|---|---|
| Type | $\Phi$ | $\Gamma$ | $L_p$ | $L_c$ |
| Euler | $\begin{bmatrix} 1 & T & 0 \\ 0 & 1 & T \\ 0 & 0 & 1 \end{bmatrix}$ | $\begin{bmatrix} 0 \\ \hat{b}T \\ 0 \end{bmatrix}$ | $\begin{bmatrix} 3(1-\beta) \\ 3(1-\beta)^2/T \\ (1-\beta)^3/T^2 \end{bmatrix}$ | $\begin{bmatrix} 1-\beta^3 \\ (1-\beta)^2(2+\beta)/T \\ (1-\beta)^3/T^2 \end{bmatrix}$ |
| ZOH | $\begin{bmatrix} 1 & T & \frac{T^2}{2} \\ 0 & 1 & T \\ 0 & 0 & 1 \end{bmatrix}$ | $\begin{bmatrix} \hat{b}\frac{T^2}{2} \\ \hat{b}T \\ 0 \end{bmatrix}$ | $\begin{bmatrix} 3(1-\beta) \\ 3(1-\beta)^2(5+\beta)/2T \\ (1-\beta)^3/T^2 \end{bmatrix}$ | $\begin{bmatrix} 1-\beta^3 \\ 3(1-\beta)^2(1+\beta)/2T \\ (1-\beta)^3/T^2 \end{bmatrix}$ |

This discrete implementation of ADRC is also generalizable to $n^{th}$-order plants 110.

Predictive Active Disturbance Rejection Controller

Figure 3:
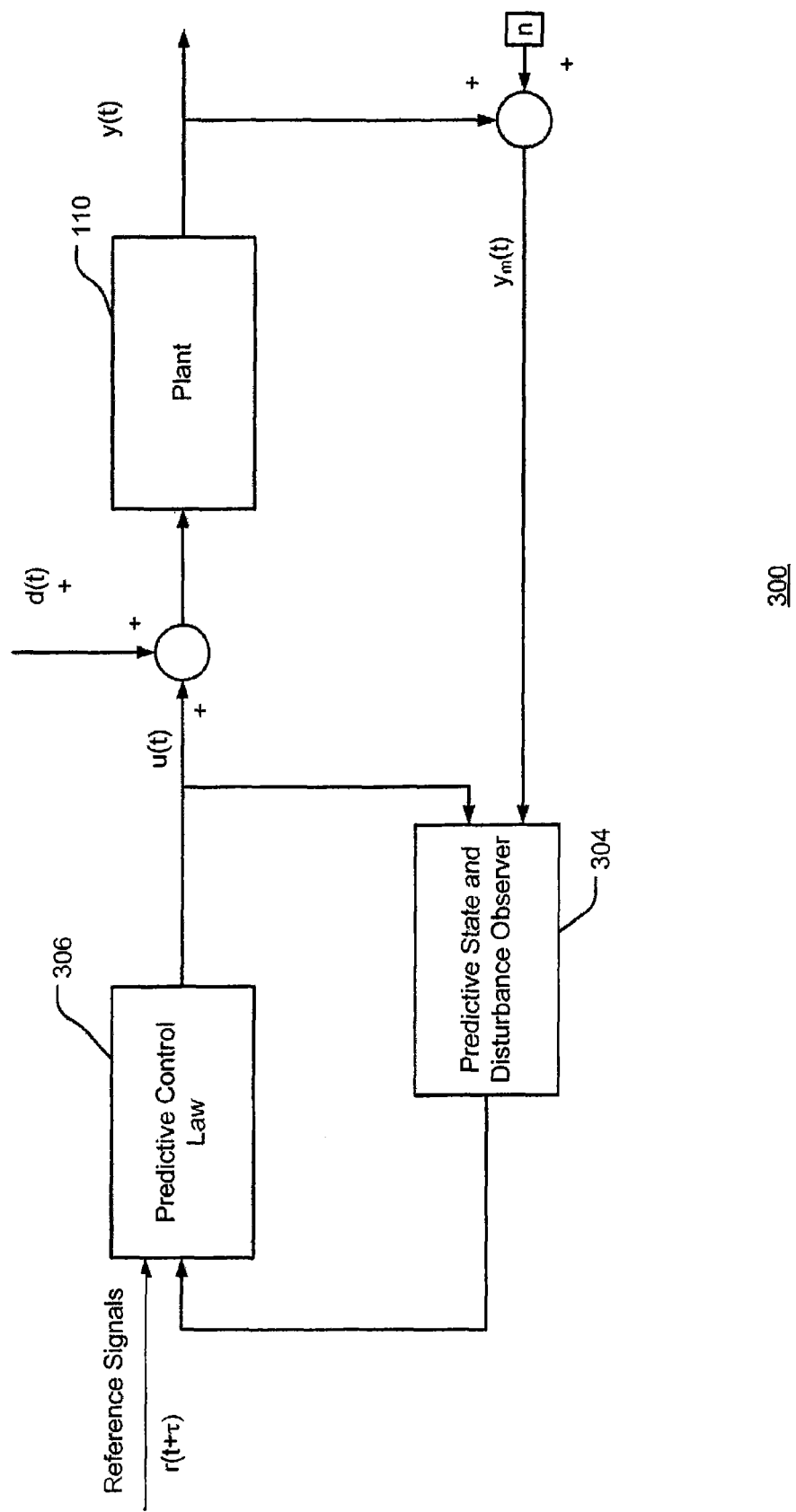
FIG. 3 is a block diagram of a predictive ADRC configuration.

The thrust of the many of the embodiments presented here is the addition of the predictive functions to extend the capabilities of the original components of the ADRC. This extends the ADRC controller and generates embodiments of predictive versions of the ADRC, such as the predictive ADRC 300, depicted in block diagram form in FIG. 3 In this embodiment, the linear PD control law 206 in the predictive ADRC 300 is now a predictive control law 306. Similarly, the observer, or more specifically the extended state observer 204 from the traditional ADRC 200 is now embodied as a predictive state and disturbance observer 304. In one embodiment the predictive state and disturbance observer 304 is a predictive extended state observer (PESO) where the prediction occurs within the bounds of the ESO 204 to where the estimated states $z_n(t)$ are predicted to form the predictive state and disturbance observer 304, and outputs the prediction of the estimated states $z_n(t+\tau)$. In a second embodiment, a state predictor method is used to extend the design of the ESO 204 to estimate the states $z_n(t)$ and form the predictive state and disturbance observer 304.

In other embodiments, other estimators and predictors, either in an integrated form or in combination are used to generate similar information as that generated by the predictive state and disturbance observer 304 and used by the embodiments predictive ADRC 300. One of these other embodiments adopts a disturbance observer (DOB) estimator structure to estimate the disturbance and a state observer and a predictor element that together form the predictive state and disturbance observer 304. In a second other embodiment, the predictive state and disturbance observer 304 utilizes an unknown input observer (UIO) estimator. Other estimators, including combinations of estimators such as the combination of a state observer and a DOB, are suitable for estimation of both the plant 110 output and the known part of the general disturbance $(f_n)$ are adaptable using the disclosure provided herein to those of ordinary skill in the art to serve as a predictive state and disturbance observer 304.

The challenge in constructing the various embodiments of a predictive controller within the general purpose ADRC controller architecture is how the various signals used by the ADRC algorithm are predicted and used. The signals used by the ADRC algorithm originate from a multitude of sources in the various embodiments, including in one embodiment the extended state observer 204 (ESO). In another embodiment, a simplified, reduced-order ESO (RESO) is used when either: (i) quality measurements of the output signals allows numerical differentiation to estimate derivatives of the output signal; or (ii) direct measurement of derivatives are possible (e.g. velocity and acceleration sensors), are available.

In another embodiment, a nonlinear proportional-derivative (NPD) control law is used to further optimize the performance of the present ADRC system. The RESO aspect of the ADRC controller provides alternative embodiments of ESO 204 and RESO; a general form of RESO with multiple extended states for an $n^{th}$-order plant 110, and incorporation of the known plant 110 dynamics into ESO 204 and control law.

Figure 4:
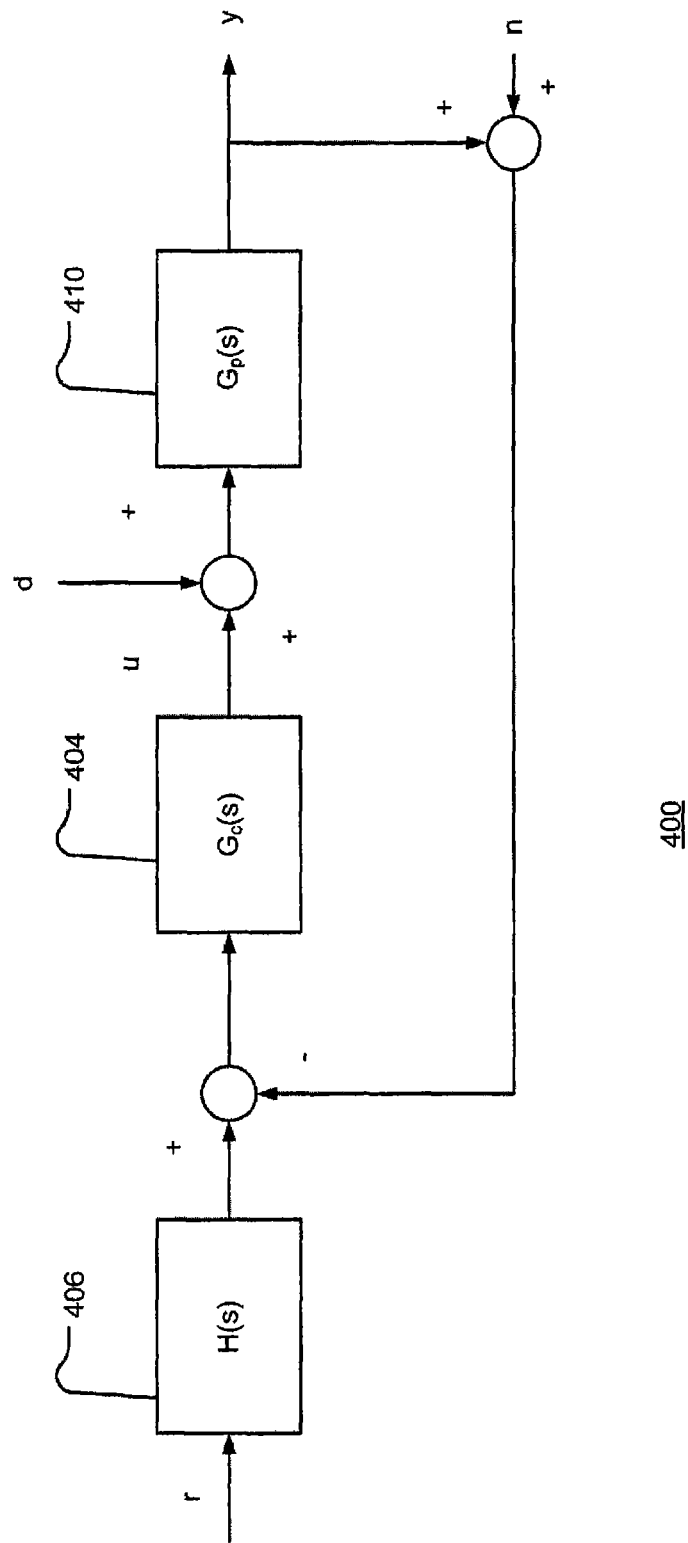
FIG. 4 is a block diagram of a 2 degree of freedom transfer function based (TFB) control structure.

Furthermore, to facilitate practical implementations of the new techniques, we have provided at selected locations herein, the transfer function equivalent predictive ADRC 400, with H(s) 402 and $G_c(s)$ 404, in a two-degree-of-freedom (2dof) structure shown in FIG. 4. Similarly, for a transfer function equivalent predictive ADRC 400, the plant dynamics are represented as $G_p(s)$ 402. For various forms of the Predictive ADRC 400 described herein, these transfer function expressions, together with the NPD and RESO, are novel and significant even when the amount of prediction is set to zero.

All of these new developments help to make the predictive ADRC 300 possible and to provide the means of implementation the present embodiments in a diverse range of industrial machinery, and they are illustrated in details in the following sections.

Basic Design Principles for Predictive ADRC

In the real world, the sensor feedback, the generation of the control signal and its arrival at the actuator, and the estimation of the states and disturbances all contain time delays and phase lags, which can endanger system stability. To accommodate such delays and lags, we propose the following Predictive ADRC control law:

$$u(t)=(g(e(t+l_e),\dot{e}(t+l_{\dot{e}}),\omega_c)+\ddot{r}(t+l_u)-\hat{f}(t+l_f))/\hat{b} \quad \text{Equation (23)}$$

where $g(e,\dot{e},\omega_c)$ is the parameterized linear PD controller 206, or nonlinear proportional derivative (NPD) controller, Equation (68), $l_e$, $l_{\dot{e}}$, $l_u$, and $l_f$ are positive real numbers representing the prediction horizons, a special case of which is $l_e=l_{\dot{e}}=l_u=l_f=\tau$ and the corresponding control law is $$u(t)=(g(e(t+\tau),\dot{e}(t+\tau),\omega_c)+\ddot{r}(t+\tau)-\hat{f}(t+\tau))/\hat{b} \quad \text{Equation (24)}$$

Also, if a part of the plant 110 dynamics, $f^n$, is given, it can be incorporated into ADRC, as shown later in this disclosure. In the context of Predictive ADRC 300, the knowledge of $f_n$ can be used to help predict its future value, $f_n(t+l_{f_n})$. The corresponding control law for Equation (23) and Equation (24) are $$u(t)=(g(e(t+l_e),\dot{e}(t+l_{\dot{e}}),\omega_c)+\ddot{r}(t+l_u)-f_n(t+l_{f_n})-\hat{f}_u(t+l_{f_u}))/\hat{b} \quad \text{Equation (25)}$$

and $$u(t)=(g(e(t+\tau),\dot{e}(t+l_\tau),\omega_c)+\ddot{r}(t+\tau)-f_n(t+\tau)-\hat{f}_u(t+\tau))/\hat{b} \quad \text{Equation (26)}$$

respectively.

Described below are various methods to obtain the prediction of $e(t)$, $\dot{e}(t)$, and $\hat{f}(t)$, respectively, so that these predictive ADRC 300 control laws can be implemented.

Prediction of e and $\dot{e}$

Two embodiments of methods for predicting the values of error $e(t)$ and its derivative are presented herein.

Method 1: Using Taylor Series, the prediction of $e(t)$, $\dot{e}(t)$ can be obtained as $e(t+l_e)=e(t)+\dot{e}(t)l_e$ or $$e(t+l_e)=e(t)+\dot{e}(t)l_e+\frac{\ddot{e}(t)}{2}l_e^2,$$

and $\dot{e}(t+l_{\dot{e}})=\dot{e}(t)+\ddot{e}(t)l_{\dot{e}}$. Here $\dot{e}(t)$ can be obtained directly from $\dot{r}-\dot{y}$, or from $\dot{r}-z_2$ using regular ESO, or $\dot{r}-z_1$ using RESO. Here $\ddot{e}(t)$ can be obtained as $\ddot{e}(t)=\ddot{r}(t)-\ddot{y}(t)\approx\ddot{r}(t)-(z_3(t)+\hat{b}u(t))$ with ESO or $\ddot{e}(t)=\ddot{r}(t)-\ddot{y}(t)\approx\ddot{r}(t)-(z_2(t)+\hat{b}u(t))$ with RESO.

Method 2: Since $e(t+\tau)=r(t+\tau)-z_1(t+\tau)$ and $\dot{e}(t+\tau)=\dot{r}(t+\tau)-z_2(t+\tau)$, $e(t+\tau)$ and $\dot{e}(t+\tau)$ can be obtained directly using the future reference signals $r(t+\tau)$ and $\dot{r}(t+\tau)$, which are generally known, and the predicted output of the ESO $z_1(t+\tau)$ and $z_2(t+\tau)$, which need to be obtained approximately.

Prediction of $\hat{f}$ in ESO and RESO

The primary method of predicting $\hat{f}$ is the $1^{st}$ or $2^{nd}$-order Taylor Series approximation, i.e.

$$\hat{f}(t+l_f)\approx\hat{f}(t)+\dot{\hat{f}}(t)l_f, \text{ or} \quad \text{Equation (27)}$$

$$\hat{f}(t+l_f) \approx \hat{f}(t) + \dot{\hat{f}}(t)l_f + \frac{\ddot{\hat{f}}(t)}{2}l_f^2 \qquad \text{Equation (28)}$$

which requires the $1^{st}$ and/or $2^{nd}$ order derivatives of $\hat{f}$. To this end, a new form and a new way of implementation of extended state observer (ESO) 204 are introduced first, followed by the discussion on how to use them to obtain the predicted estimate of f in Equation (27) and Equation (28).

Reduced-Order ESO

In the observer-based control methods, the phase lag introduced by the observer decreases the phase margin of the control loop and is therefore undesired. To reduce the phase lag in the ESO 204, an embodiment of a reduced-order ESO (RESO) described here.

Consider the plant 202 in Equation (9), if the derivative of the measured output $y_m$ ($\dot{y}_m$), is given, a RESO can be constructed with $z_1$ and $z_2$ estimating $x_2 = \dot{y}$ and $x_3 = f$ respectively. The correspondence between the augmented plant state space model and the RESO is shown as follows.

$$\dot{x} = \begin{bmatrix} 0 & 1 & 0 \\ 0 & 0 & 1 \\ 0 & 0 & 0 \end{bmatrix} X + \begin{bmatrix} 0 \\ b \\ 0 \end{bmatrix} u + \begin{bmatrix} 0 \\ 0 \\ 1 \end{bmatrix} \dot{f} \quad \begin{bmatrix} \dot{z}_1 \\ \dot{z}_2 \end{bmatrix} = \begin{bmatrix} 0 & 1 \\ 0 & 1 \end{bmatrix} \begin{bmatrix} z_1 \\ z_2 \end{bmatrix} + \begin{bmatrix} \hat{b} \\ 0 \end{bmatrix} u + \begin{bmatrix} l_1 \\ l_2 \end{bmatrix} (\dot{y}_m - z_1)$$

$$y = [1\ 0\ 0]\ x \qquad \hat{f} = [0\ 1]\ z$$

The shadowed blocks show how the gain matrices of the RESO are obtained from the augmented plant state space model. Equivalently, the RESO can be represented as $$\begin{cases} \dot{z} = A_z z + B_z u + L(\dot{y}_m - C_z z) \\ \hat{f} = V z \end{cases} \qquad \text{Equation (30)}$$

where $$A_z = \begin{bmatrix} 0 & 1 \\ 0 & 0 \end{bmatrix},\ B_z = \begin{bmatrix} \hat{b} \\ 0 \end{bmatrix},\ L = \begin{bmatrix} l_1 \\ l_2 \end{bmatrix},$$

$C_z = [1\ 0], V = [0\ 1]$, and $l_1 = 2\omega_o, l_2 = \omega_o^2$.

With RESO replacing the ESO 204, the corresponding linear PD control law 206 in ADRC 400 is $$u = (g_{pd}(e, \dot{e}, \omega_c) + \ddot{r} - z_2)/\hat{b} \qquad \text{Equation (31)}$$

where $$e = r - y_m, \dot{e} = \dot{r} - z_1 \qquad \text{Equation (32)}$$

If $\dot{y}_m$ is clean it can be also fed back into the control law instead of $z_1$, the Equation (33) changes to $$e = r - y_m, \dot{e} = \dot{r} - \dot{y}_m \qquad \text{Equation (34)}$$

Note here that the parameterized linear PD control law 206 can be replaced by the parameterized NPD control law 506, which will be introduced later.

The order of ESO 204 is reduced further if $\ddot{y}$ is also given, as the double derivative of $y_m$. According to U.S. patent application Ser. No. 10/351,664, the total disturbance is obtained as $x_3 = f = \ddot{y} - bu$ and it is susceptible to measurement noise. In an alternative embodiment, a first order RESO can be constructed with the only state z tracking $x_3 = f$. The correspondence between the augmented plant state space model and the new RESO is shown as follows.

$$\dot{x} = \begin{bmatrix} 0 & 1 & 0 \\ 0 & 0 & 1 \\ 0 & 0 & 0 \end{bmatrix} x + \begin{bmatrix} 0 \\ b \\ 0 \end{bmatrix} u + \begin{bmatrix} 0 \\ 0 \\ 1 \end{bmatrix} \dot{f}$$

$$y = [1\ 0\ 0]\ x$$

$$\dot{z} = [0]\ z + [0]\ u + 1 \cdot (\ddot{y}_m - \hat{b}u - z)$$

$$\hat{f} = z$$

The shadowed blocks show how the gain matrices of the RESO are obtained from the augmented plant state space model. Equivalently, the RESO can be represented as $$\text{Equation (29)}$$

$$\begin{cases} \dot{z} = A_z z + B_z u + L(\ddot{y}_m - \hat{b}u - C_z z) \\ \hat{f} = V z \end{cases} \qquad \text{Equation (35)}$$

where $A_z = 0, B_z = 0, L = 1 = \omega_o, C_z = 1, V = 1$. The corresponding linear PD control law 206 with this RESO is $$u = (g_{pd}(e, \dot{e}, \omega_c) + \ddot{r} - z)/\hat{b} \qquad \text{Equation (36)}$$

where $e = r - y_m$, $\dot{e} = \dot{r} - \dot{y}_m$. Note here again that the parameterized linear PD control law 206 can be replaced by the parameterized NPD control law 506 to be introduced.

A New ESO Implementation

Consider the same second-order plant 202 as described in Equation (9). The ESO 204 described in U.S. patent application Ser. No. 10/351,664 can be divided into two parts.

$$\begin{cases} \begin{bmatrix} \dot{z}_1 \\ \dot{z}_2 \end{bmatrix} = \begin{bmatrix} 0 & 1 \\ 0 & 0 \end{bmatrix} \begin{bmatrix} z_1 \\ z_2 \end{bmatrix} + \begin{bmatrix} 0 \\ \hat{b} \end{bmatrix} u + \begin{bmatrix} l_1 \\ l_2 \end{bmatrix} (y_m - z_1) \\ z_3 = \int l_3 (y_m - z_1) dt \end{cases} \qquad \text{Equation (37)}$$

The first part is a Luenberger observer for the double integral plant in Equation (13), and the second part shows that the estimation of the general disturbance can be obtained by integrating the observer error with a gain of $l_3$. This implementation is equivalent to the ESO 204.

When implemented in ZOH current estimator form, the Luenberger observer is $$\begin{cases} z[k+1] = \Phi z[k] + \Gamma u[k] + L_p(y_m[k] - z_1[k]) \\ \bar{z}[k] = z[k] + L_c(y_m[k] - z_1[k]) \end{cases} \quad \text{Equation (38)}$$

where $$\Phi = \begin{bmatrix} 1 & T \\ 0 & 1 \end{bmatrix}, \Gamma = \begin{bmatrix} \hat{b}\frac{T^2}{2} \\ \hat{b}T \end{bmatrix}, L_c = \begin{bmatrix} 1-\beta_2 \\ (1+\beta_2 - 2\beta_1)/T \end{bmatrix},$$

$$L_p = \begin{bmatrix} 2 - 2\beta_1 \\ (1+\beta_2 - 2\beta_1)/T \end{bmatrix},$$

and $$\beta_1 = e^{\frac{-3}{2}\omega_o T}\cos\left(\frac{\sqrt{3}}{2}\omega_o T\right), \beta_2 = e^{-3\omega_o T}.$$

Similarly, the RESO in Equation (30) can be divided into two parts:

$$\begin{cases} \dot{z}_1 = \hat{b}u + l_1(y_m - z_1) \\ z_2 = \int l_2(y_m - z_1)dt \end{cases} \quad \text{Equation (39)}$$

where the first part is a first order Luenberger observer, and the second part is an integrator. When implemented in ZOH current estimator form, this Luenberger observer is $$\begin{cases} z_1[k+1] = \Phi z_1[k] + \Gamma u[k] + L_p(y_m[k] - z_1[k]) \\ \bar{z}_1[k] = z_1[k] + L_c(y_m[k] - z_1[k]) \end{cases} \quad \text{Equation (40)}$$

where $\Phi=1$, $\Gamma=\hat{b}T$, $L_c=L_p=1-\beta$, and $\beta=e^{-2\omega_o T}$.

Prediction of $\hat{f}$

With the new implementation of ESO 204, $\hat{f}=\int l_3(y_m-z_1)dt$, $\dot{\hat{f}}=l_3(y_m-z_1)$ and $\ddot{\hat{f}}=l_3(\dot{y}_m-z_2)$, and this enables us to determine $\hat{f}(t+l_f)$ based on the $1^{st}$ or $2^{nd}$-order Taylor series approximation shown in $$\hat{f}(t+l_f) \approx \int l_3(y_m-z_1)dt + l_f l_3(y_m-z_1) \quad \text{Equation (41)}$$

or $$\hat{f}(t+l_f) \approx \int l_3(y_m-z_1)dt + l_f l_3(y_m-z_1) + \frac{l_f^2 l_3}{2}(\dot{y}_m - z_2) \quad \text{Equation (42)}$$

With RESO, $\hat{f}(t+l_f)$ is obtained as $$\hat{f}(t+l_f) \approx \int l_2(y_m-z_1)dt + l_f l_2(y_m-z_1) \quad \text{Equation (43)}$$

Equivalent 2dof Transfer Functions with Prediction in ESO

Using prediction in ESO 204, with the $1^{st}$-order Taylor series approximation of future value of f used in control law 404, the equivalent 2dof transfer functions are $$C(s) = \frac{1}{\hat{b}} \frac{l_f l_3 s^3 + (k_p l_1 + k_d l_2 + l_3)s^2 +}{s^3 + (l_1 + k_d)s^2 + (l_2 + k_p + k_d l_1 - l_f l_3)s} \quad \text{Equation (44)}$$

$$H(s) = \frac{(s^3 + l_1 s^2 + l_2 s + l_3)(s^2 + k_d s + k_p)}{l_f l_3 s^3 + (k_p l_1 + k_d l_2 + l_3)s^2 +} \quad \text{Equation (45)}$$
$$(k_p l_2 + k_d l_3)s + k_1 l_3$$

where $l_1, l_2, l_3$ are observer gains defined in Equation (11) and $k_p$ and $k_d$ are the proportional-derivative (PD) gains defined in Equation (17).

When the $2^{nd}$-order Taylor series approximation of $\hat{f}$ is used in control law 404, the equivalent 2dof transfer functions are $$C(s) = \frac{1}{\hat{b}} \frac{\frac{l_f^2 l_3}{2}s^4 + \left(l_f l_3 + \frac{l_f^2 l_1 l_3}{2}\right)s^3 +}{(k_p l_1 + k_d l_2 + l_3)s^2 + (k_p l_2 + k_d l_3)s + k_1 l_3} \quad \text{Equation (46)}$$
$$s^3 + \left(l_1 + k_d - \frac{l_f^2 l_3}{2}\right)s^2 +$$
$$\left(l_2 + k_p + k_d l_1 - l_f l_3 - \frac{l_f^2 l_1 l_3}{2}\right)s$$

$$H(s) = \frac{(s^3 + l_1 s^2 + l_2 s + l_3)(s^2 + k_d s + k_p)}{\frac{l_f^2 l_3}{2}s^4 + \left(l_f l_3 + \frac{l_f^2 l_1 l_3}{2}\right)s^3 +} \quad \text{Equation (47)}$$
$$(k_p l_1 + k_d l_2 + l_3)s^2 + (k_p l_2 + k_d l_3)s + k_1 l_3$$

Equivalent 2dof Transfer Function with Prediction in RESO

The equivalent 2dof transfer functions of ADRC-RESO with prediction in $\hat{f}$ are as follows.

$$G_c(s) = \frac{1}{\hat{b}} \frac{l_f l_2 s^3 + (k_p + k_d l_1 + l_2)s^2 +}{s^2 + (k_d + l_1 - l_f l_2)s} \quad \text{Equation (48)}$$
$$(k_p l_1 + k_d l_2)s + k_p l_2$$

$$H(s) = \frac{(s^2 + l_1 s + l_2)(k_p + k_d s + s^2)}{l_f l_2 s^3 + (k_p + k_d l_1 + l_2)s^2 +} \quad \text{Equation (49)}$$
$$(k_p l_1 + k_d l_2)s + k_p l_2$$

where $l_1, l_2$ are observer gains defined in Equation (35).

State Predictor Method for Predictive Extended State Observer

Another embodiment for forming a predictive state and disturbance observer 304 module is to use a state predictor method to extend the performance of a baseline ESO 204 to predict state estimates τ seconds in the future. The basic state predictor method approach was published by T. Oguchi, H. Nijmeijer, *Prediction of Chaotic Behavior*, IEEE Trans. on Circuits and Systems-I, Vol. 52, No. 11, pp. 2464-2472, 2005, which is hereby incorporated by reference. The state predictor method is combined in the embodiments presented herein with the regular ESO 204 of the form $$\dot{z} = Az + Bu + L(y - \hat{y})$$

$$\hat{y} = Cz \quad \text{Equation (50)}$$

where $$A = \begin{bmatrix} 0 & 1 & 0 \\ 0 & 0 & 1 \\ 0 & 0 & 0 \end{bmatrix}, B = \begin{bmatrix} 0 \\ \hat{b} \\ 0 \end{bmatrix}, C = \begin{bmatrix} 1 & 0 & 0 \end{bmatrix}, \quad \text{Equation (51)}$$

$$L = \begin{bmatrix} 3\omega_o \\ 3\omega_o^2 \\ \omega_o^3 \end{bmatrix}$$

to form the predictive ESO is in the form of $$\dot{z}(t) = Az(t) + Bu(t) + L(y(t) - \hat{y}(t))$$

$$\hat{y}(t) = Cz(t-\tau) \quad \text{Equation (52)}$$

Then $\hat{y}(t) = z_1(t-\tau)$ will track $y(t)$ while $z_1(t) = \hat{y}(t+\tau)$ is its prediction $\tau$ seconds ahead. The ideas is that since the observer design ensures that the observer error goes to zero, or becomes very small, if that error is defined as the difference between $y(t)$ and $z_1(t-\tau)$ and $z_1(t-\tau)$ will approach $y(t)$ and $z_1(t)$ will approach $y(t+\tau)$. Therefore $z_1(t)$ can be used as a prediction of $y(t)$ $\tau$ second ahead.

Figure 5:
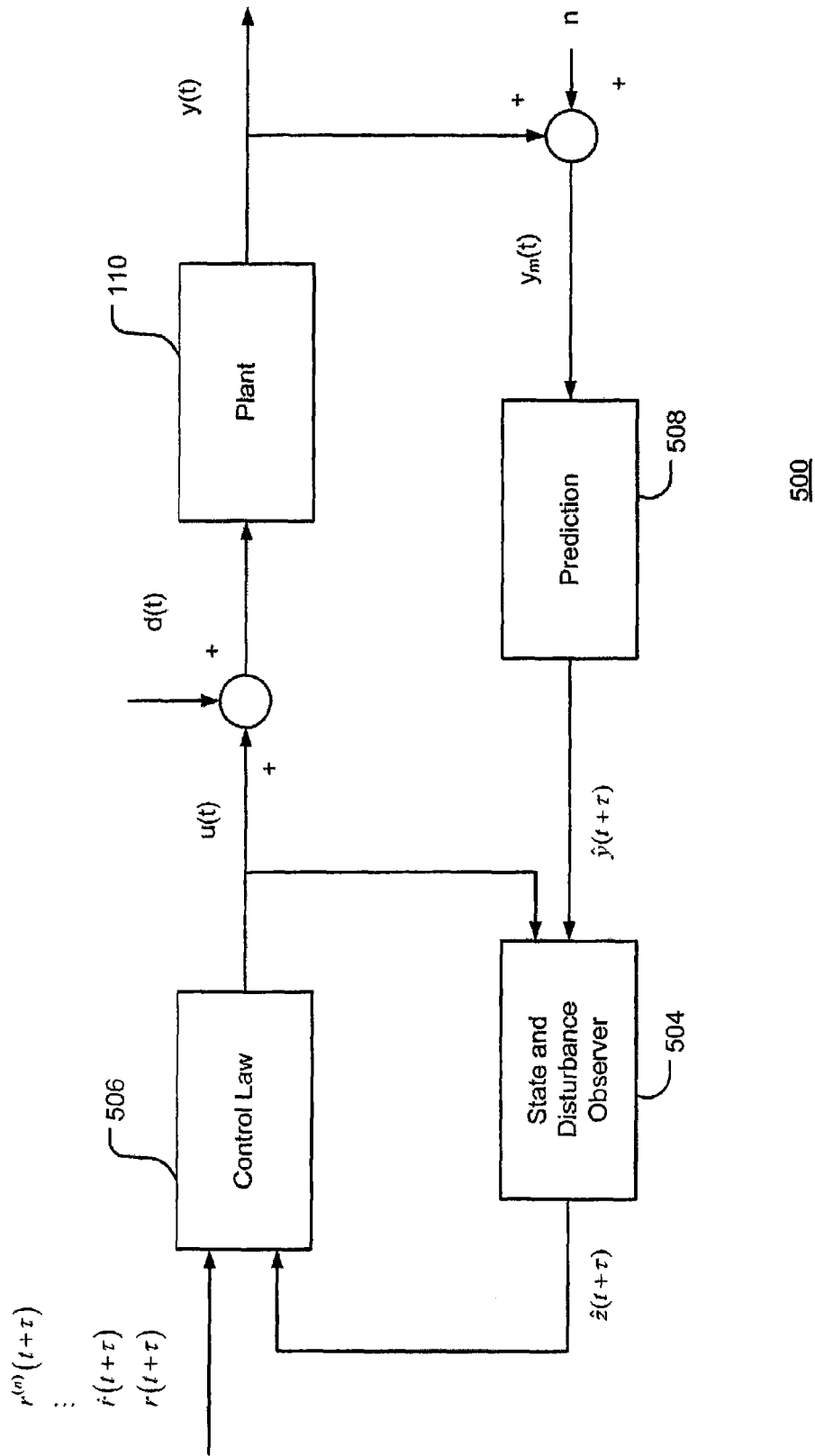
FIG. 5 is a block diagram of an implementation of a PADRC configuration based on output prediction.

Building a Predictive State and Disturbance Observer Using an Output Prediction Mechanism Perhaps a simpler method to obtain $z(t+\tau)$ is to leave the observer unchanged but replace its input $y_m(t)$ with the predicted output $\hat{y}(t+\tau)$ as shown in FIG. 5. This configuration is used both to obtain the predicted error and its derivatives as well as the predicted disturbance estimation. Also depicted in FIG. 5 is a prediction module computer component or more generally a prediction module 508. The prediction module 508 is adapted to accept the measured system output ($y_m(t)$) and calculated estimated values of the system output ($\hat{y}(t+\tau)$) from the present time to a time ($\tau$) in the future.

A state and disturbance observer 504, shown in FIG. 5, accepts the predicted and current values of the plant output ($y_m$) and the control commands ($u(t)$) to estimate the future estimated states ($z_n(t+\tau)$) where (n) is the number of estimated states plus an estimate of the generalized disturbance ($f_n$). The state and disturbance observer 504 in one embodiment is an ESO 204. In a second embodiment, the state and disturbance observer 504 is a disturbance observer (DOB) structure. In yet another embodiment, the state and disturbance observer 504 is an unknown input observer (UID). It is apparent that the combination of the state and disturbance observer 504 in combination with the prediction module 508 provides a similar output and performance a similar function within the framework of an output predictive ADRC controller 500 as the predictive state and disturbance observer 304 of the predictive ADRC controller 300. In this manner, the various embodiments of the predictive ADRC controller 300 and output predictive ADRC controller 500 are correlated.

Also shown in FIG. 5, a control law 506 is provided that uses the estimated future states of the plant 110 coupled with the desired trajectory ($r^{(n)}(t+\tau)$) to generate a current control input ($u(t)$). The embodiment of the control law 506 depicted in FIG. 5 incorporates the additive inverse of the estimated future values of the estimated disturbance ($f_n$).

Combine the Output Prediction with Regular ESO

To compensate for the delay, $y(t)$ is replaced with the approximately predicted output $\hat{y}(t+\tau)$ as the input to the ESO 204. Again, the approximated prediction, $\hat{y}(t+\tau)$, is obtained from the Taylor Series approximation. The 1$^{st}$-order Taylor series approximation and the 2$^{nd}$-order Taylor series approximation of $\hat{y}(t+\tau)$ are as shown in the following equations respectively.

$$\hat{y}(t+\tau) = y_m(t) + \dot{y}_m(t)\tau \quad \text{Equation (53)}$$

$$\hat{y}(t+\tau) = y_m(t) + \dot{y}_m(t)\tau + \frac{\ddot{y}_m(t)}{2}\tau^2 \quad \text{Equation (54)}$$

Then the predicted system output and the current control signal are used as the inputs to the ESO 204 as follows.

$$\begin{cases} \dot{z}(t+\tau) = A_z z(t+\tau) + B_z u(t) + L(\hat{y}(t+\tau) - C_z z(t+\tau)) \\ \hat{f}(t+\tau) = Vz(t+\tau) \end{cases} \quad \text{Equation (55)}$$

which will provide both the predicted states and the disturbance estimation in $z(t+\tau)$.

Equivalent 2dof Transfer Functions

When the 1$^{st}$-order Taylor series approximation is used to obtain $\hat{y}(t+\tau)$, the equivalent 2dof transfer functions are $$C(s) = \frac{1}{\hat{b}} \frac{\left( \begin{array}{c} (l_3 + k_d l_2 + l_1 k_p)s^2 + \\ (k_p l_2 + l_3 k_d)s + k_p l_3 \end{array} \right)(1 + \tau s)}{s(s^2 + (l_1 + k_d)s + (l_2 + k_p + k_d l_1))} \quad \text{Equation (56)}$$

$$H(s) = \frac{(s^3 + l_1 s^2 + l_2 s + l_3)(k_p + k_d s + s^2)}{\left( \begin{array}{c} (l_3 + k_d l_2 + l_1 k_p)s^2 + \\ (k_p l_2 + l_3 k_d)s + k_p l_3 \end{array} \right)(1 + \tau s)} \quad \text{Equation (57)}$$

When the 2$^{nd}$-order Taylor Series approximation is used to obtain $\hat{y}(t+\tau)$, the equivalent 2dof transfer functions are $$C(s) = \frac{1}{\hat{b}} \frac{\left( \begin{array}{c} (l_3 + k_d l_2 + l_1 k_p)s^2 + \\ (k_p l_2 + l_3 k_d)s + k_p l_3 \end{array} \right)\left(1 + \tau s + \frac{\tau^2}{2}s^2\right)}{s(s^2 + (l_1 + k_d)s + (l_2 + k_p + k_d l_1))} \quad \text{Equation (58)}$$

$$H(s) = \frac{(s^3 + l_1 s^2 + l_2 s + l_3)(k_p + k_d s + s^2)}{\left( \begin{array}{c} (l_3 + k_d l_2 + l_1 k_p)s^2 + \\ (k_p l_2 + l_3 k_d)s + k_p l_3 \end{array} \right)\left(1 + \tau s + \frac{\tau^2}{2}s^2\right)} \quad \text{Equation (59)}$$

Combine the Output Prediction with RESO

With the RESO configuration, the prediction is obtained as $$\hat{\dot{y}}(t+\tau) = \dot{y}_m(t) + \ddot{y}_m(t)\tau \quad \text{Equation (60)}$$

and the new RESO is constructed as $$\begin{cases} \dot{z}(t+\tau) = A_z z(t+\tau) + B_z u(t) + L(\hat{\dot{y}}(t+\tau) - C_z z(t+\tau)) \\ \hat{f}(t+\tau) = Vz(t+\tau) \end{cases} \quad \text{Equation (61)}$$

where $$A_z = \begin{bmatrix} 0 & 1 \\ 0 & 0 \end{bmatrix}, B_z = \begin{bmatrix} \hat{b} \\ 0 \end{bmatrix}, L = \begin{bmatrix} l_1 \\ l_2 \end{bmatrix},$$

$C_z = [1 \ 0], V = [0 \ 1]$, and $l_1 = 2\omega_o, l_2 = \omega_o^2$. which again provides the predicted state and disturbance estimation in $z(t+\tau)$.

Equivalent 2 dof Transfer Functions

With the above the $1^{st}$-order Taylor Series approximation $\hat{y}(t+\tau)$ is used as the input to the RESO, the equivalent 2dof transfer functions are:

$$C(s) = \frac{1}{\hat{b}} \frac{\left(\begin{array}{c}(k_p + k_d l_1 + l_2)s^2 + \\ (k_p l_1 + l_2 k_d)s + k_p l_2\end{array}\right)(1+\tau s)}{s(s+(l_1+k_d))} \quad \text{Equation (62)}$$

$$H(s) = \frac{(s^2 + l_1 s + l_2)(k_p + k_d s + s^2)}{\left(\begin{array}{c}(k_p + k_d l_1 + l_2)s^2 + \\ (k_p l_1 + l_2 k_d)s + k_p l_2\end{array}\right)(1+\tau s)} \quad \text{Equation (63)}$$

Combine the Output Prediction with RESO

With the RESO configuration, the prediction is obtained as $$\dot{\hat{y}}(t+\tau) = \dot{y}_m(t) + \ddot{y}_m(t)\tau \quad \text{Equation (64)}$$

and the new RESO is constructed as $$\begin{cases} \dot{z}(t+\tau) = A_z z(t+\tau) + B_z u(t) + L(\hat{y}(t+\tau) - C_z z(t+\tau)) \\ \hat{f}(t+\tau) = V z(t+\tau) \end{cases} \quad \text{Equation (65)}$$

where $$A_z = \begin{bmatrix} 0 & 1 \\ 0 & 0 \end{bmatrix}, B_z = \begin{bmatrix} \hat{b} \\ 0 \end{bmatrix}, L = \begin{bmatrix} l_1 \\ l_2 \end{bmatrix},$$

$C_z = [1 \ 0], V = [0 \ 1]$, and $l_1 = 2\omega_o, l_2 = \omega_o^2$. which again provides the predicted state and disturbance estimation in $z(t+\tau)$.

Equivalent 2 dof Transfer Functions

With the above the $1^{st}$-order Taylor Series approximation $\hat{y}(t+\tau)$ is used as the input to the RESO, the equivalent 2dof transfer functions are $$C(s) = \frac{1}{\hat{b}} \frac{\left(\begin{array}{c}(k_p + k_d l_1 + l_2)s^2 + \\ (k_p l_1 + l_2 k_d)s + k_p l_2\end{array}\right)(1+\tau s)}{s(s+(l_1+k_d))} \quad \text{Equation (66)}$$

$$H(s) = \frac{(s^2 + l_1 s + l_2)(k_p + k_d s + s^2)}{\left(\begin{array}{c}(k_p + k_d l_1 + l_2)s^2 + \\ (k_p l_1 + l_2 k_d)s + k_p l_2\end{array}\right)(1+\tau s)} \quad \text{Equation (67)}$$

A Parameterized Nonlinear PD Control Law, Replacing the Linear PD Controller The parameterized linear PD control law 206 $g_{pd}(e,\dot{e},\omega_c)$ used above can be replaced by the following parameterized Nonlinear PD (NPD) control law 506 $g_{npd}(e,\dot{e},\omega_c)$:

$$y = \omega_c^2 e + \omega_c \dot{e}, \quad \text{Equation (68)}$$

$$x = \begin{cases} \omega_c \dot{e} + \dfrac{\sqrt{R(R+8|y|)} - R}{2} \text{sign}(y), & |y| > R \\ \omega_c(\omega_c e + 2\dot{e}), & |y| \le R \end{cases}$$

$$g_{npd}(e,\dot{e},\omega_c) = \begin{cases} R\,\text{sign}(x), & |x| > R \\ x, & |x| \le R \end{cases}$$

where $$\text{sign}(x) = \begin{cases} 1, & x \ge 0 \\ -1, & x < 0. \end{cases}$$

Equation (68) shows that, within the region $|x| \le R$ and $|y| \le R$, this parameterized NPD control law 506 is $\omega_c^2 e + 2\omega_c \dot{e}$, which is the same as the parameterized linear PD control law 206 in Equation (15); outside this region, however, the NPD control law 506 is nonlinear. This new NPD control law 506 can be used to replace the linear PD control law 206 in the original ADRC 200 algorithm to achieve better performance. In one embodiment the NPD control law 506 is used in conjunction with a predicted state estimate $z_n(t+\tau)$. In a second embodiment, the NPD control law 506 is uses only the current state estimate $(z_n(t)$.

A General Form of Reduced-Order Multiple Extended-state ESO for an $n^{th}$-Order Plant Although the Predictive ADRC 300 has been presented with an ESO 204 or RESO with only one extended state, the same technique can be readily extended to a general $n^{th}$-order plant with an ESO 240 or RESO that has multiple extended states. To facilitate such development, we present here a general form of the reduced-order multiple extended states ESO 204 for an $n^{th}$-order plant of the form $$y^{(n)} = f(y, \dot{y}, \ldots, y^{(n-1)}, d, t) + bu \quad \text{Equation (69)}$$

Let the n states be $x_1 = y, x_2 = \dot{x}_1 = \dot{y}, \ldots, x_n = \dot{x}_{n-1} = y^{(n-1)}$, and the h extended states be $x_{n+1} = f, x_{n+2} = \dot{x}_{n+1} = \dot{f}, \ldots, x_{n+h} = \dot{x}_{n+h-1} = f^{(h-1)}$. The plant 110 in Equation (69) can now be expressed in the augmented form:

$$\dot{x} = \begin{bmatrix} \dot{x}_1 \\ \dot{x}_2 \\ \vdots \\ \dot{x}_{n+h-m} \\ \dot{x}_{n+h-m+1} \\ \vdots \\ \dot{x}_n \\ \dot{x}_{n+1} \\ \vdots \\ \dot{x}_{n+h} \end{bmatrix} =$$

$$\begin{bmatrix} 0 & 1 & 0 & 0 & 0 & \cdots & 0 & 0 & 0 & 0 \\ 0 & 0 & 1 & 0 & \ddots & \ddots & \ddots & \ddots & \ddots & 0 \\ \vdots & \ddots & \ddots & \ddots & 0 & \ddots & \ddots & \ddots & \ddots & \vdots \\ 0 & 0 & \ddots & 0 & 1 & 0 & \ddots & \ddots & \ddots & 0 \\ 0 & \ddots & \ddots & \ddots & 0 & 1 & 0 & \ddots & \ddots & 0 \\ \vdots & \ddots & \ddots & \ddots & \ddots & 0 & 0 & 1 & \ddots & \vdots \\ 0 & \ddots & \ddots & \ddots & \ddots & \ddots & 0 & 0 & 0 & 1 & \ddots & 0 \\ 0 & \ddots & \ddots & \ddots & \ddots & \ddots & \ddots & \ddots & \ddots & 0 \\ \vdots & \ddots & \ddots & \ddots & \ddots & \ddots & \ddots & \ddots & \ddots & 1 \\ 0 & 0 & 0 & 0 & 0 & 0 & 0 & \cdots & 0 & 0 \end{bmatrix} \begin{bmatrix} x_1 \\ x_2 \\ \vdots \\ x_{n+h-m} \\ x_{n+h-m+1} \\ \vdots \\ x_n \\ x_{n+1} \\ \vdots \\ x_{n+h} \end{bmatrix} +$$

-continued $$\begin{bmatrix} 0 \\ 0 \\ \vdots \\ 0 \\ b \\ 0 \\ \vdots \\ 0 \end{bmatrix} u + \begin{bmatrix} 0 \\ 0 \\ \vdots \\ 0 \\ 0 \\ 0 \\ \vdots \\ 0 \\ 1 \end{bmatrix} \dot{f}$$

or equivalently $$\begin{cases} \dot{x} = A_x x + B_x u + E f^{(h)} \\ y = C_x x \end{cases} \qquad \text{Equation (70)}$$

where $$A_x = \begin{bmatrix} 0 & 1 & 0 & \cdots & 0 \\ 0 & 0 & 1 & \ddots & \vdots \\ 0 & 0 & 0 & \ddots & 0 \\ \vdots & \ddots & \ddots & \ddots & 1 \\ 0 & \cdots & 0 & \cdots & 0 \end{bmatrix}_{(n+h) \times (n+h)},$$

$$B_x = \begin{bmatrix} 0 \\ \vdots \\ 0 \\ b \\ 0 \\ \vdots \\ 0 \end{bmatrix}_{(n+h) \times 1}, \quad E = \begin{bmatrix} 0 \\ \vdots \\ 0 \\ 1 \end{bmatrix}_{(n+h) \times 1},$$

$C_x = [1\ 0\ \ldots\ 0]_{1 \times (n+h)}$, and the nonzero element in $B_x$ is in the $n^{th}$ row.

Assume that $y, \dot{y}, \ldots, y^{(n+h-m)}$ are measured or otherwise available as $y_m, \dot{y}_m, \ldots, y_m^{(n+h-m)}$, then the approximate states $x_1, x_2, \ldots, x_{n+h-m+1}$ are available (If m=h, the last state can be obtained from its definition: $x_{n+1} = f = y_m^{(n)} - \hat{b}u$). Also assume $f^{(n)}$ does not change rapidly and can be handled by the observer. The ESO 204 order can be reduced to m, where $h \le m \le n+h$. With $x_{n+h-m+1}$ and u as inputs, and with $z_1, \ldots, z_m$ estimating $x_{n+h-m+1}, \ldots, x_{n+h}$ respectively, the general ESO 204 form is $$\dot{z} = \begin{bmatrix} \dot{z}_1 \\ \vdots \\ \dot{z}_{m-h} \\ \dot{z}_{m-h+1} \\ \vdots \\ \dot{z}_m \end{bmatrix} = \begin{bmatrix} 0 & 1 & 0 & \cdots & 0 \\ & & 1 & & \\ 0 & & & & 0 \\ 0 & & & & 0 \\ & & & & 1 \\ 0 & 0 & & \cdots & 0 \end{bmatrix} \begin{bmatrix} z_1 \\ \vdots \\ z_{m-h} \\ z_{m-h+1} \\ \vdots \\ z_m \end{bmatrix} +$$

$$\begin{bmatrix} 0 \\ \vdots \\ \hat{b} \\ 0 \\ \vdots \\ 0 \end{bmatrix} u + \begin{bmatrix} l_1 \\ \vdots \\ l_{m-h} \\ l_{m-h+1} \\ \vdots \\ l_m \end{bmatrix} (x_{n+h-m+1} - z_1)$$

$$\hat{f} = [0\ \ldots\ 0\ 1\ \ldots\ 0]z$$

or in state space form $$\begin{cases} \dot{z} = A_z z + B_z u + L(x_{n+h-m+1} - C_z z) \\ \hat{f} = Vz \end{cases} \qquad \text{Equation (71)}$$

where $$A_z = \begin{bmatrix} 0 & 1 & 0 & \cdots & 0 \\ 0 & 0 & 1 & \ddots & \vdots \\ 0 & 0 & 0 & \ddots & 0 \\ \vdots & \ddots & \ddots & \ddots & 1 \\ 0 & \cdots & 0 & \cdots & 0 \end{bmatrix}_{m \times m},$$

$$L = \begin{bmatrix} l_1 \\ l_2 \\ \vdots \\ l_m \end{bmatrix}_{m \times 1}, \quad C_z = [1\ 0\ \ldots\ 0]_{1 \times m},$$

if m=h, $B_z = [0]_{m \times 1}$; if $$m > h,\ B_z = \begin{bmatrix} 0 \\ \vdots \\ 0 \\ \hat{b} \\ 0 \\ \vdots \\ 0 \end{bmatrix}_{m \times 1}, \quad V = \begin{bmatrix} 0 \\ \vdots \\ 0 \\ 1 \\ 0 \\ \vdots \\ 0 \end{bmatrix}_{m \times 1}^{T}$$

Thus, when m>h the nonzero elements of $B_z$ and V are in the $(m-h)^{th}$ and $(m-h+1)^{th}$ column respectively.

For tuning simplicity, the observer gains $l_1, \ldots, l_m$ are chosen as $$l_i = \binom{m}{i} \omega_o^i,$$

$0 < i \le m$.

$$\binom{m}{i}$$

denotes the Binomial Coefficient $$\frac{m!}{i!(m-i)!}.$$

Also, to make the transfer function derivation easier, define $$l_0 = \binom{m}{0} \omega_o^0 = 1.$$

With the state $z_{m-h+1}$ in the ESO 204 to estimate f, a control law, $u = (u_0 - z_{m-h+1})/\hat{b}$, is applied to reduce the plant to a pure $n^{th}$-order cascade integral plant $y^{(n)}=u_0$, which can be easily controlled using the parameterized linear PD control law 206 of the form $$u_0 = \sum_{i=1}^{n+1} k_i r^{(i-1)} - \sum_{i=1}^{n+h-m} k_i y_m^{(i-1)} - \sum_{i=1}^{m-h+1} k_{n+h-m+i} z_i \quad \text{Equation (72)}$$

where $$k_i = \binom{m}{i-1} \omega_c^{n+1-i},$$

$0 \leq i \leq n+1$, and the middle term, $$\sum_{i=1}^{n+h-m} k_i y^{(i-1)},$$

is corresponding to the order reduction (it disappears when the inputs of ESO 204 are $y_m$ and u). In the case where the measured output $y_m$ is clean and its derivatives can be obtained from $y_m$, ADRC 200 can also be applied as $$u_0 = \sum_{i=1}^{n+1} k_i r^{(i-1)} - \sum_{i=1}^{n} k_i y_m^{(i-1)} - z_{m-h+1} \quad \text{Equation (73)}$$

The corresponding transfer function representation of ADRC 400, in a 2dof structure (as shown in FIG. 4) is $$H(s) = \frac{\Psi_{0,m}^m \sum_{j=1}^{n+1} k_j s^{j-1}}{\Psi_{0,m}^m \sum_{j=1}^{n+h-m} k_j s^{(j-1)} + \sum_{j=1}^{m-h+1} k_{n+h-m+j} s^{n+h-1-m+j} \Psi_{j,m}^m} \quad \text{Equation (74)}$$

$$G_c(s) = \frac{1}{\hat{b}} \frac{\Psi_{0,m}^m \sum_{j=1}^{n+h-m} k_j s^{(j-1)} + \sum_{j=1}^{m-h+1} k_{n+h-m+j} s^{n+h-1-m+j} \Psi_{j,m}^m}{\sum_{j=1}^{m-h+1} k_{n+h-m+j} s^{h-1+j-m} \Psi_{0,j-1}^m} \quad \text{Equation (75)}$$

where $$\Psi_{x,y}^m = \sum_{i=x}^{y} l_i s^{m-i},$$

$0 \leq x \leq y$.

ADRC with Partially Known Plant Dynamics

ADRC controller does not require the detail plant model information. However, if the whole or part of the plant dynamics is known, various embodiments of the ADRC controller can be modified to utilize the information to estimate and reject disturbance more effectively, either by control law modification or ESO 204 modification. With a part of the plant dynamics known, the known part of the generalized disturbance can be generated and rejected in the control law directly, while the rest of the generalized disturbance is estimated by ESO 204 and then rejected in the linear PD control law 206 as previously shown in the original ADRC 200 framework. The other way to utilize the partially known plant dynamics is adapting the dynamics into ESO 204, where ESO 204 still estimates the generalized disturbance.

Consider the second-order plant 202 in Equation (8), with the knowledge of the plant information, part of the generalized disturbance is known, denoted as $f_n(y,\dot{y})$. The rest is unknown part of the generalized disturbance, denoted as $f_u(y,\dot{y},d,t)$. The plant in Equation (9) can now be described as $$\ddot{y} = f_n(y,\dot{y},d,t) + bu \quad \text{Equation (76)}$$

and there are two ways to take advantage of new information in $f_n(y,\dot{y})$ and incorporate it into ADRC 200. One way is to improve ESO 204 by combining $f_n(x)$ with $A_x x + B_x u$ in the plant space description in Equation (76). The augmented state space form of the plant is $$\begin{cases} \dot{x} = A_x x + E \hat{f}_n(x) + B_x u + E \hat{f}_u \\ y = C_x x \end{cases} \quad \text{Equation (77)}$$

and the corresponding ESO 204 is $$\begin{cases} \dot{z} = A_x z + E \hat{f}_n(z) + B_x u + L(y_m - C_x z) \\ \hat{f} = Vz \end{cases} \quad \text{Equation (78)}$$

Then a new ESO 204 can be constructed to estimate the generalized disturbance f based on the new state space description of the plant 110 in Equation (77). For example, consider the plant $\ddot{y} = -a_1 \dot{y} + bu$ where $a_1$ is given, i.e. $f_n(y,\dot{y}) = -a_1 \dot{y}$. The known part of the generalized disturbance is obtained from the model information: $\hat{f}_n = -a_1 \ddot{y} = -a_1(-a_1 \dot{y} + bu)$. In this case where $f_n(y,\dot{y})$ is a linear function, the augmented state space representation of the plant 110 can be written as $$\begin{cases} \dot{x} = \bar{A}_x x + \bar{B}_x u + E \hat{f}_u \\ y = C_x x, \end{cases} \quad \text{Equation (79)}$$

where $\bar{A}_x = \begin{bmatrix} 0 & 1 & 0 \\ 0 & 0 & 1 \\ 0 & a_1^2 & 0 \end{bmatrix}, \bar{B}_x = \begin{bmatrix} 0 \\ b \\ -a_1 b \end{bmatrix}$ and the new ESO is $\dot{z} = \bar{A}_x z + \bar{B}_z u + L(y_m - C_x z)$, where $\bar{B}_z = [0\ \hat{b}\ -a_1 \hat{b}]^T$.

The other way of taking advantage of the additional information in $f_n(y,\dot{y})$ is to use it to cancel known plant dynamics in the control law directly. There are three ways to do this:

$$u = (g(e,\dot{e},\omega_c) + \ddot{r} - f_n(y_m,\dot{y}_m) - z_3)/\hat{b} \quad \text{Equation (80)}$$

or $y_m$ and $\dot{y}_m$ can be replaced by $z_1$ and $z_2$ in the control law, $$u = (g(e,\dot{e},\omega_c) + \ddot{r} - f_n(z_1,z_2) - z_3)/\hat{b} \quad \text{Equation (81)}$$

or $y_m$ and $\dot{y}_m$ can be replaced by r and $\dot{r}$ respectively and rejected in the control law in a feedforward manner.

$$u = (g(e,\dot{e},\omega_c) + \ddot{r} - f_n(r,\dot{r}) - z_3)/\hat{b} \quad \text{Equation (82)}$$

where $g(e,\dot{e},\omega_c)$ is the parameterized PD controller 206 or NPD controller defined in Equation (15) or Equation (68) respectively. Of course, any combination of the above three methods are available for use by one of ordinary skill in the art.

INDUSTRIAL APPLICATIONS

The present active disturbance rejection controller, and its associated processes, methods and devices as disclosed herein possesses a number of unique attributes and industrial applicability, including for example, utility as a controller for tracking control, web processing applications, and jet engine control applications as described in greater detail above.

For example, in the case of tracking or motion control applications, the various predictive methods presented herein, particularly the ones that use the knowledge of the plant dynamics, offer reduced phase lag in the observer and compensate for the time delay in the plant itself, all of which especially benefit tracking applications that employ a desired output trajectory, sometimes called motion profile.

CONCLUSION

While various embodiments of the present system and method for feedback control of systems have been described above, it should be understood that the embodiments have been presented by the way of example only, and not limitation. It will be understood by those skilled in the art that various changes in form and details may be made therein without departing from the spirit and scope of the invention as defined. Thus, the breadth and scope of the present invention should not be limited by any of the above described exemplary embodiments.

What is claimed is:

1. A controller, comprising:
    a predictive state and disturbance observer module configured to receive a sensor signal and a disturbance adjusted control signal, and to output extended state estimate data representing a state of a plant, an extended state of a plant system dynamic and an external disturbance of the plant, and a predicted extended state estimate, wherein the sensor signal is based on an output associated with the plant; and
    a control module configured to output a control signal based on the extended state estimate data, the predicted extended state estimate, a trajectory and a trajectory prediction; and
    wherein the extended state of the plant system dynamic is adapted to cause an input-output characteristic of the output and an associated input of the plant to behave as a double-integral plant with a scaling factor.

2. The controller of claim 1, wherein the predictive state and disturbance observer module comprises a system output predictor and an extended state observer.

3. The controller of claim 2, wherein the system output predictor is configured to predict a future value of the sensor signal using a Taylor series approximation.

4. The controller of claim 2, wherein the control module comprises a non-linear control law given by an equation:

$$y = \omega_c^2 e + \omega_c \dot{e},$$

$$x = \begin{cases} \omega_c \dot{e} + \dfrac{\sqrt{R(R+8|y|)} - R}{2}\text{sign}(y), & |y| > R \\ \omega_c(\omega_c e + 2\dot{e}), & |y| \le R \end{cases}$$

$$g_{npd}(e, \dot{e}, \omega_c) = \begin{cases} R\,\text{sign}(x), & |x| > R \\ x, & |x| \le R \end{cases}$$

$$\text{sign}(x) = \begin{cases} 1, & x \ge 0 \\ -1, & x < 0 \end{cases}$$

and where $\omega_c$ is a frequency of the controller, e is an error, R is a maximum control signal, and $g_{ndp}$ is the control signal.

5. The controller of claim 2, wherein the sensor signal represents at least a first derivative of the output of the plant, and wherein the extended state observer is a reduced order extended state observer.

6. The controller of claim 1, wherein the predictive state and disturbance observer module comprises a predictive extended state observer.

7. The controller of claim 1, wherein the predictive state and disturbance observer module comprises an observer model of a dynamic of the plant.

8. The controller of claim 1, wherein the control module further comprises an additive inverse model of a function ($f_n$) that comprises an estimate of a dynamic of the plant and the external disturbance.

9. A computer-implemented method for controlling a plant, comprising:
    estimating an extended state for the plant using a sensed output of the plant, wherein the extended state comprises a state of the plant and a total disturbance of the plant, and wherein the extended state is adapted to cause an input-output characteristic of the plant to behave as a double-integral plant with a scaling factor;
    predicting a change in the extended state to generate a state prediction and an extended state prediction;
    specifying a trajectory for an output of the plant to follow, wherein the trajectory comprises a desired trajectory and a prediction of a future desired trajectory;
    applying a control law to the desired trajectory and the prediction of the future desired trajectory, the extended state, and the extended state; and
    generating a control output based on application of the control law.

* * * * *